United States Patent
Matsusaka

(10) Patent No.: US 6,867,933 B2
(45) Date of Patent: Mar. 15, 2005

(54) IMAGE-TAKING APPARATUS, AND CAMERA AND CAMERA SYSTEM INCORPORATING IT

(75) Inventor: Keiji Matsusaka, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/663,960

(22) Filed: Sep. 16, 2003

(65) Prior Publication Data

US 2004/0257677 A1 Dec. 23, 2004

(30) Foreign Application Priority Data

Jun. 19, 2003 (JP) .................................... 2003-175264

(51) Int. Cl.$^7$ .......................... G02B 9/34; G02B 13/18; G02B 16/17; G06K 9/40
(52) U.S. Cl. ....................... 359/783; 359/715; 348/335; 382/275
(58) Field of Search .............................. 348/220.1, 294, 348/335; 359/671, 708, 715, 781, 782, 783; 382/153, 275

(56) References Cited

U.S. PATENT DOCUMENTS

| | | | |
|---|---|---|---|
| 5,272,540 A | 12/1993 | Hirata et al. | ................ 348/781 |
| 2004/0179100 A1 * | 9/2004 | Ueyama | ..................... 348/152 |

FOREIGN PATENT DOCUMENTS

| | | | | | |
|---|---|---|---|---|---|
| JP | 05232208 A | * | 9/1993 | ............ | G01S/3/782 |
| JP | 2000341568 A | * | 12/2000 | ............ | H04N/5/225 |

OTHER PUBLICATIONS

Y. Kuniyoshi et al., "A Foveated Wide Angle Lens for Active Vision", Proc. IEEE Int. Conf. Robotics and Automation, pp. 2982–2988, 1995, URL: http://www.is.aist.go.jp/acac/publications/ICRA95.ps.

Y. Suematu et al., "A Wide Angle Vision Sensor with Fovea—Design of Distortion Lens and Simulated Images—", IEEE International Industrial Electronics Conference, USA, pp. 1770–1773, 1993.

* cited by examiner

Primary Examiner—David N. Spector
(74) Attorney, Agent, or Firm—Sidley Austin Brown & Wood LLP

(57) ABSTRACT

An image-taking apparatus has an image sensor for converting an optical image into an electrical signal, and a taking lens system for forming the optical image on the light-receiving surface of the image sensor. The most object-side surface of the taking lens system is an aspherical surface that has a positive optical power in a central portion thereof and a negative optical power in a peripheral portion thereof, and the following condition is fulfilled: −90<Da<−20, where Da represents the distortion (%) observed at the maximum half view angle in the diagonal direction of the image sensor.

22 Claims, 24 Drawing Sheets

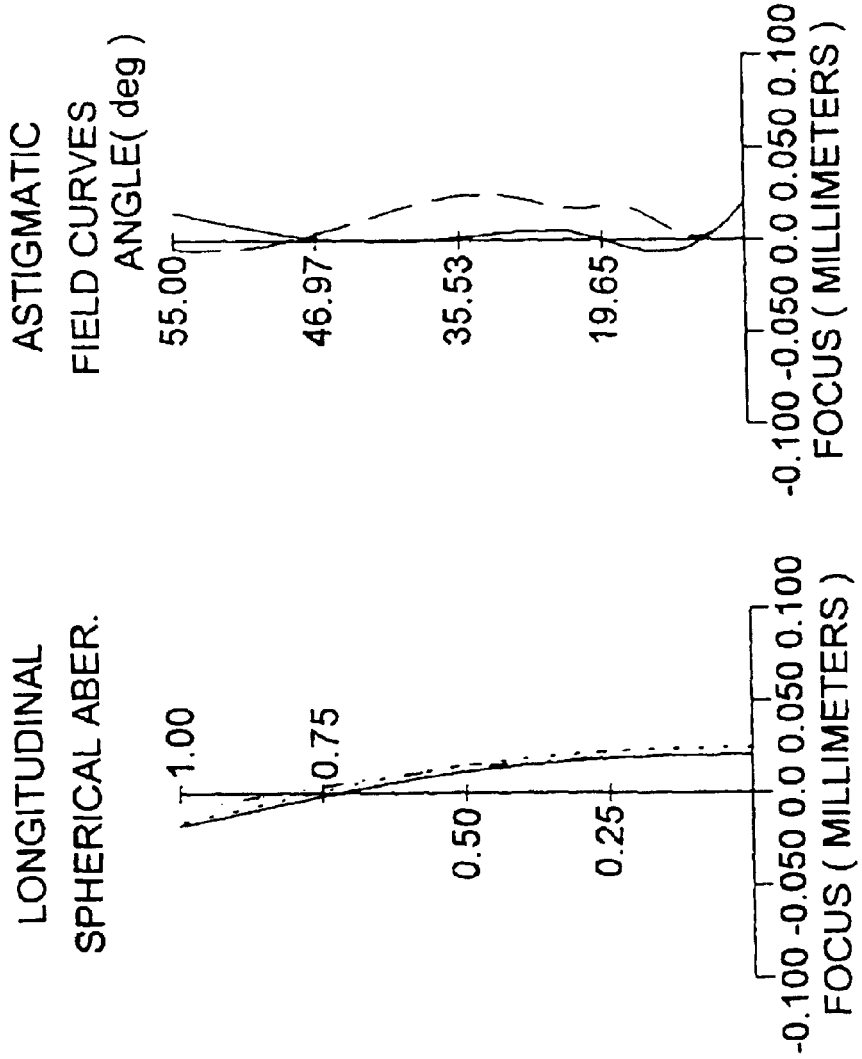

FIG.9C

DISTORTION
ANGLE(deg)

33.00
25.97
17.99
9.22

-60.0 -30.0 0.0 30.0 60.0
% DISTORTION

FIG.9B

ASTIGMATIC
FIELD CURVES
ANGLE(deg)

33.00
25.97
17.99
9.22

-0.100 -0.050 0.0 0.050 0.100
FOCUS (MILLIMETERS)

FIG.9A

LONGITUDINAL
SPHERICAL ABER.

1.00
0.75
0.50
0.25

-0.100 -0.050 0.0 0.050 0.100
FOCUS (MILLIMETERS)

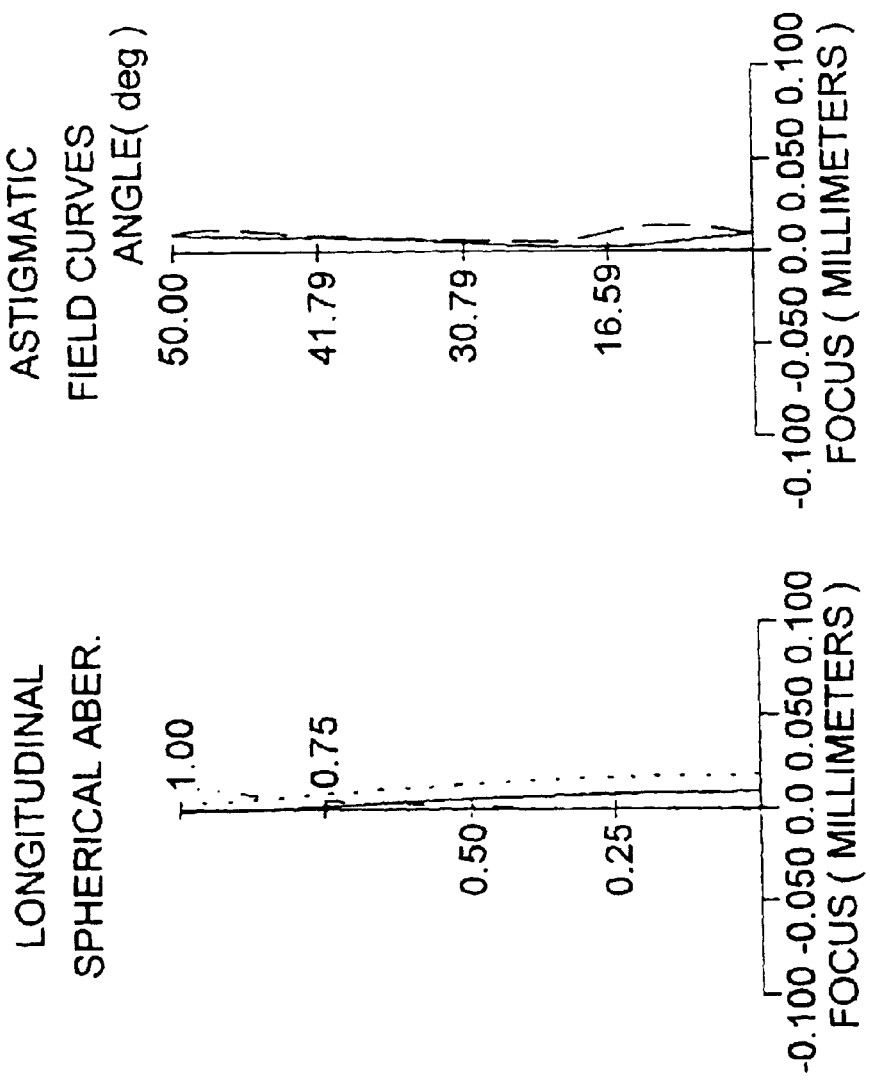

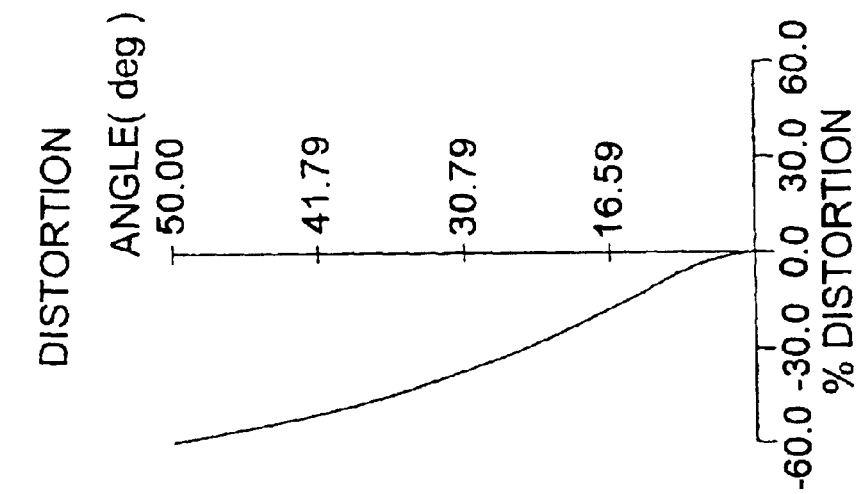
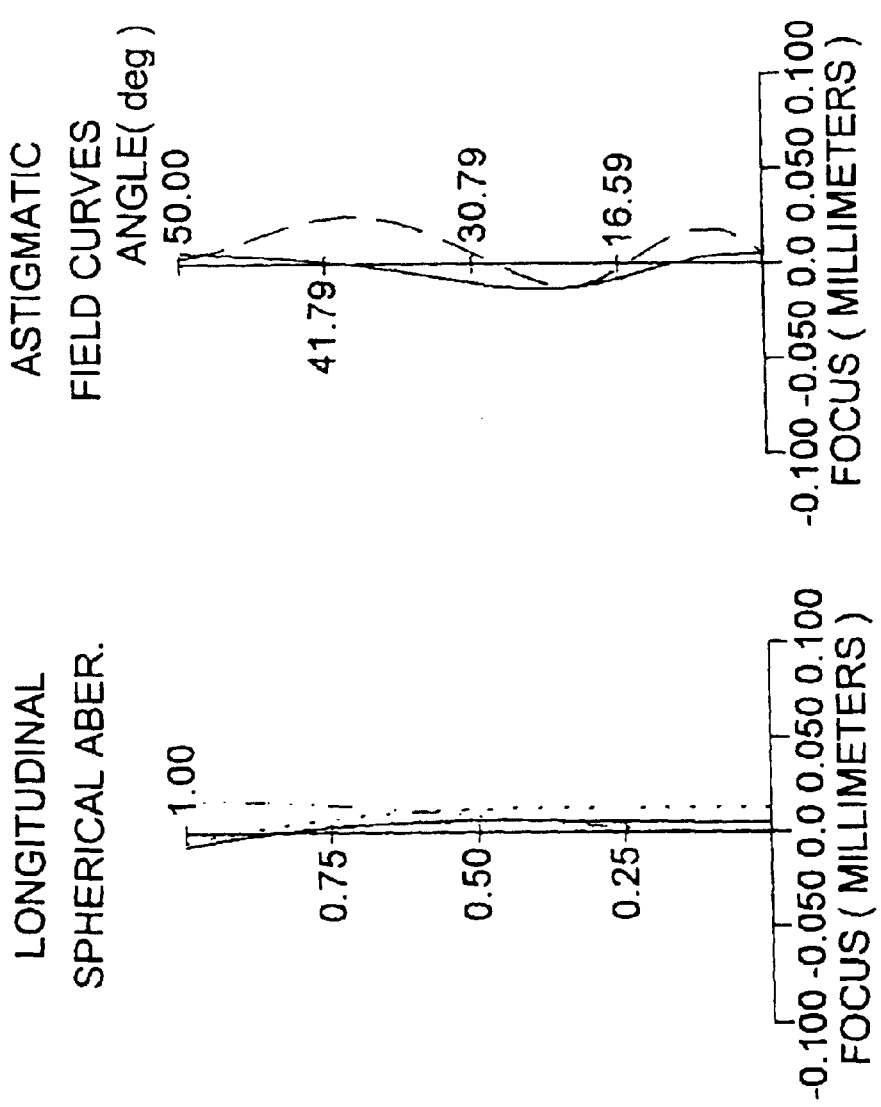

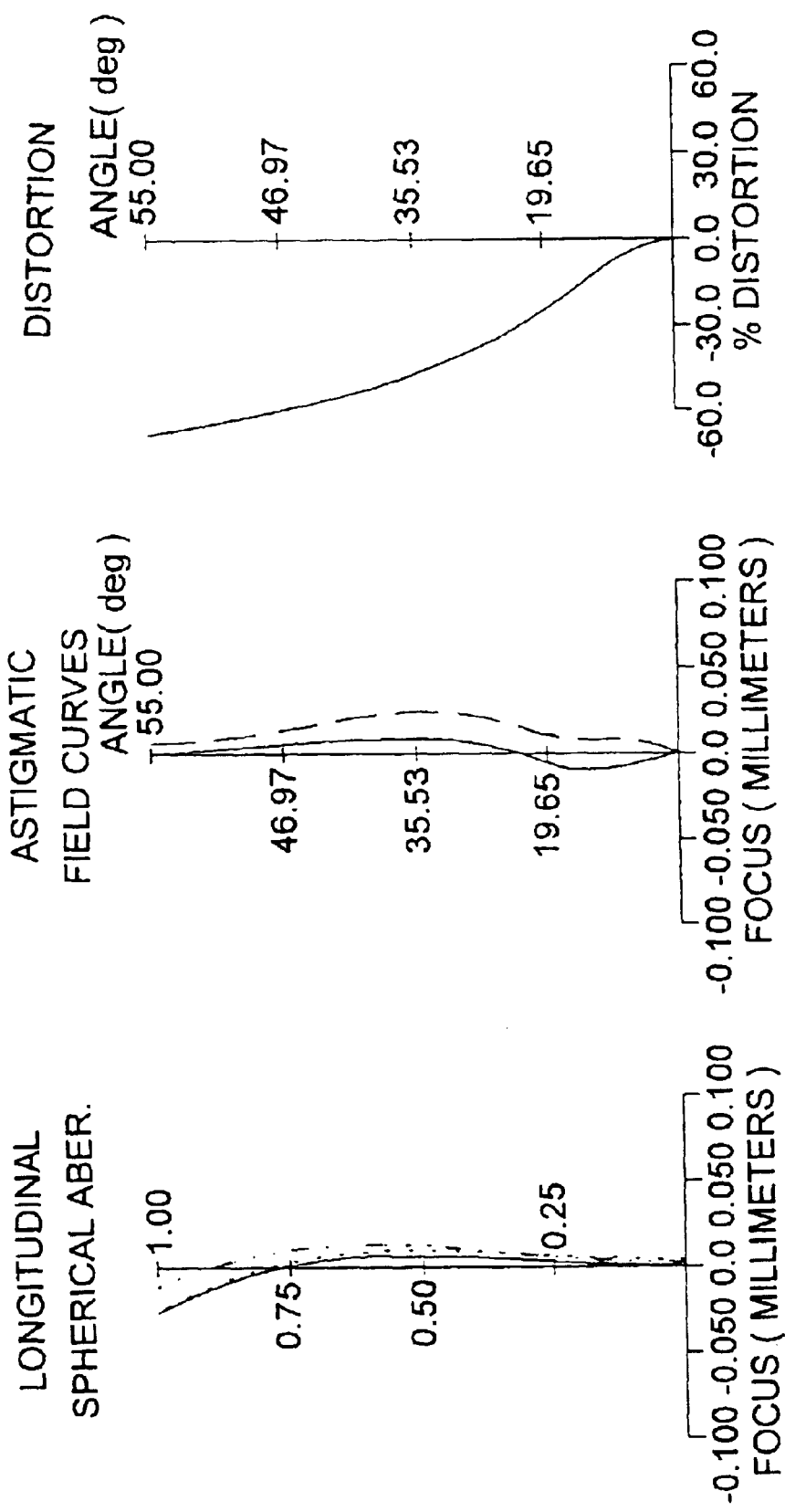

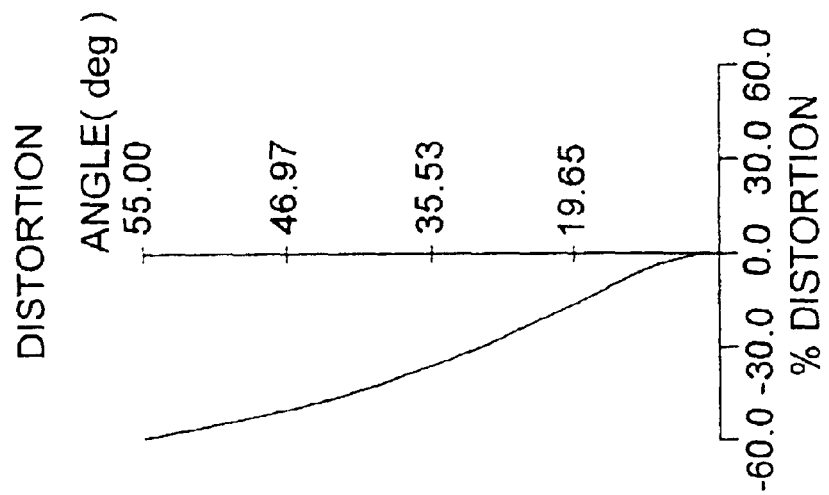
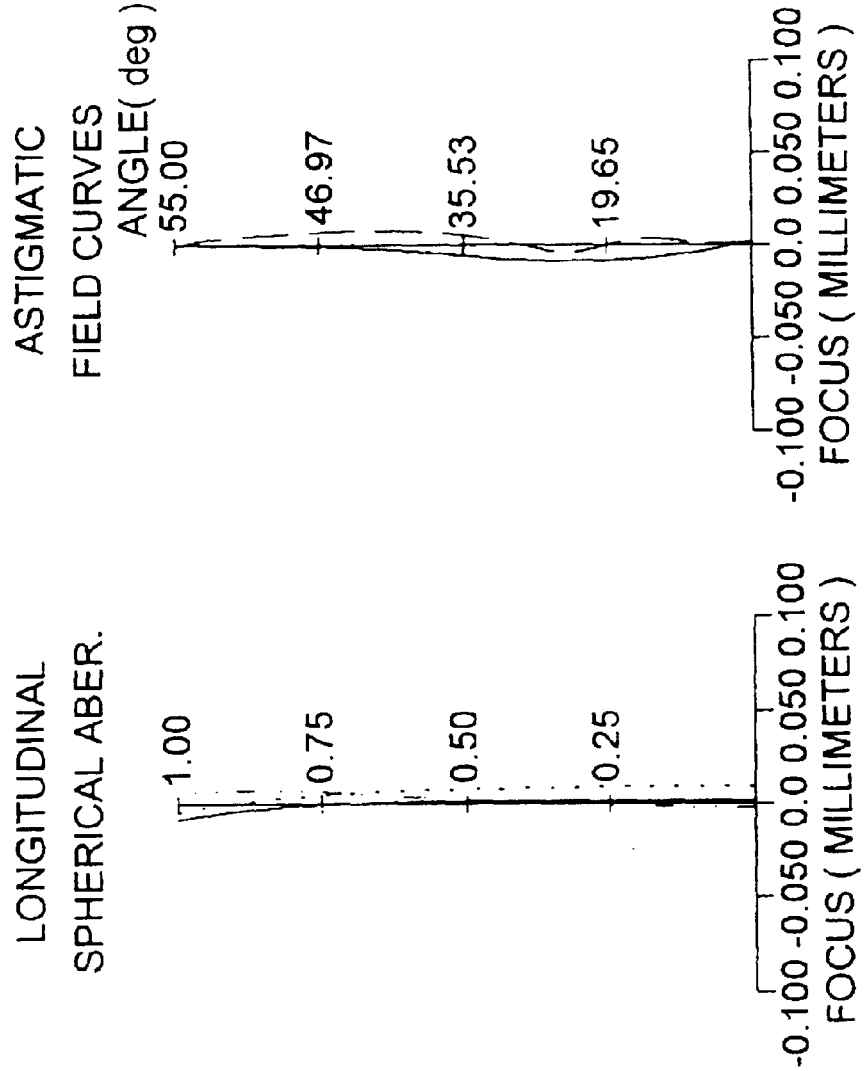

IMAGE-TAKING APPARATUS, AND CAMERA AND CAMERA SYSTEM INCORPORATING IT

This application is based on Japanese Patent Application No. 2003-175264 filed on Jun. 19, 2003, the contents of which are hereby incorporated by reference.

BACKGROUND OF THE INVENTION

1. Field of the Invention

The present invention relates to an image-taking apparatus, and to a camera and a camera system incorporating it. More specifically, the present invention relates to an image-taking apparatus provided with a taking lens system that offers a wide angle of view and simultaneously offers high definition in a central region of a telephoto image, and to a camera and a camera system incorporating such an image-taking apparatus.

2. Description of the Prior Art

Common image-taking apparatuses adopt taking lens systems that have satisfactorily corrected distortion so that there is only a small variation in image magnification between in a central and a peripheral portion of the light-receiving surface (i.e., the image-sensing surface) of an image sensor. Apart from these, there also exist taking lens systems that are designed to produce large negative distortion. Such taking lens systems, of which an example is a fish-eye lens having a total angle of view as wide as about 180°, are used to obtain super-wide-angle images. With these, by intentionally producing negative distortion, a peripheral portion of an image is greatly compressed relative to a central portion thereof.

Non-patent references 1 and 2 cited below propose wide-angle lenses for use in an eye of a robot (hereinafter, such a lens will be referred to as a "fovea lens") which have characteristics close to those of the latter of the two types of taking lens systems described above. All such fovea lenses are designed to mimic human vision. In the human eye, there is a region called the "fovea centralis," inside which optic cells (nerve cells sensitive to light) crowd more densely than outside. Although the eyesight is poor outside the fovea centralis, the movement of the eyeball permits the region of interest to be always observed with the fovea centralis. This is a highly efficient structure from the viewpoint of minimizing the amount of information handled. A fovea lens, which mimics this structure of the fovea centralis, has high definition only in a limited central region so as to reduce the total amount of input image information and thereby enhance the image processing speed. Another big feature of a fovea lens is that it has a far higher image magnification in a central portion of the image-sensing surface than a fish-eye lens or the like. As a result, a fovea lens, despite being a single-focal-length lens having no optical zooming capability, makes it possible to simultaneously obtain a wide-angle image as a whole and a telephoto image in a central portion of that image.

Non-patent reference 1

Y. Kuniyoshi, N. Kita, K. Sugimoto, S. Nakamura, T. Suehiro: "A Foveated Wide Angle Lens for Active Vision," Proc. IEEE Int. Conf. Robotics and Automation, pp. 2982–2988, 1995 (searched on line on Mar. 26, 2003 on the Internet, URL: http://www.is.aist.go.jp/acac/publications/ICRA95.ps).

Non-patent reference 2

Y. Suematu, H. Yamada, T. Ueda: "A Wide Angle Vision Sensor with Fovea—Design of Distortion Lens and the Simulated Images—," IEEE International Industrial Electronics Conference, USA, pp. 1770–1773 (1993).

Attempting to obtain an image without distortion even in a peripheral portion thereof with a wide-angel lens having a total angle of view over 60° results, due to an increased number of lens elements and other factors, in complicating the construction of the optical system, leading to higher costs. Attempting to record a super-wide-angle image with uniformly high definition results in handling a huge amount of information, necessitating an expensive high-resolution image sensor. Such an increase in the amount of information to be handled is undesirable from the viewpoint of quick transfer of data when image information is exchanged in cellular phones, personal information assistants, and the like, which are becoming increasingly popular these days, In super-wide-angle lenses (or fish-eye lenses) that are designed to intentionally produce large negative distortion, one method to obtain an enlarged image in a central portion of the overall image is with optical zooming, whereby part of the optical system is moved, and another is with electronic zooming, whereby image data is interpolated through image processing. The former method complicates the construction of both the optical system and the drive mechanism, leading to higher costs, and the latter method degrades image quality.

On the other hand, conventional fovea lenses are composed of 7 to 11 lens elements, and thus have a large-scale optical system. Moreover, all those lens elements are glass lens elements, resulting in high costs. Moreover, they suffer from large residual aberrations and thus unsatisfactory imaging characteristics. For these reasons, conventional fovea lenses are unsuitable for achieving high image quality, compactness, and low costs. Moreover, they all have an f-number as low as f4, and it is difficult to give them large apertures.

SUMMARY OF THE INVENTION

An object of the present invention is, by exploiting the advantages of a fovea lens, to provide an image-taking apparatus provided with a high-performance taking lens system that has a large aperture but that nevertheless is compact.

To achieve the above object, according to one aspect of the present invention, an image-taking apparatus is provided with: an image sensor for converting an optical image into an electrical signal; and a taking lens system for forming the optical image on the light-receiving surface of the image sensor. Here, the most object-side surface of the taking lens system is an aspherical surface that has a positive optical power in a central portion thereof and a negative optical power in a peripheral portion thereof, and the following condition is fulfilled:

$$-90 < Da < -20$$

where

Da represents the distortion (%) observed at the maximum half view angle in the diagonal direction of the image sensor.

According to another aspect of the present invention, an image-taking apparatus is provided with: an image sensor for converting an optical image into an electrical signal; and a taking lens system for forming the optical image on the light-receiving surface of the image sensor. The taking lens system is composed of, from the object side to the image side thereof: a front lens unit having a positive optical power as a whole; an aperture stop; and a rear lens unit having a positive optical power as a whole. Here, at least one surface included in the front lens unit is an aspherical surface that has a positive optical power in a central portion thereof and a negative optical power in a peripheral portion thereof, and the same condition as noted above is fulfilled.

According to still another aspect of the present invention, a camera is provided with an image-taking apparatus as described above. Here, the camera has at least one of a capability of shooting a still picture and a capability of shooting a moving picture.

According to a further aspect of the present invention, a camera system is provided with: an image-taking apparatus as described above; and an image processor for correcting distortion. Here, the image processor converts the electrical signal representing the optical image into image data of an image that is roughly similar to a scene perceived by a human eye and that is substantially distortionless.

BRIEF DESCRIPTION OF THE DRAWINGS

This and other objects and features of the present invention will become clear from the following description, taken in conjunction with the preferred embodiments with reference to the accompanying drawings in which:

FIGS. 8A to 8C are aberration diagrams of Example 1;

FIGS. 9A to 9C are aberration diagrams of Example 2;

FIGS. 11A to 11C are aberration diagrams of Example 4;

FIGS. 12A to 12C are aberration diagrams of Example 5;

FIGS. 13A to 13C are aberration diagrams of Example 6;

FIGS. 14A to 14C are aberration diagrams of Example 7;

DESCRIPTION OF THE PREFERRED EMBODIMENTS

Hereinafter, image-taking apparatuses embodying the present invention will be described with reference to the drawings. An image-taking apparatus is an optical apparatus that takes in an image of a subject optically and outputs it in the form of an electrical signal. An image-taking apparatus is composed of an image input optical system that forms an optical image of an object (subject), an image sensor that converts the optical image into an electrical signal, and other components. An image-taking apparatus is used as a main component of a camera that is used to shoot a still or moving picture of a subject. Examples of such cameras include digital cameras, video cameras, surveillance cameras, car-mounted cameras, cameras for videophones, cameras for intercoms, and cameras incorporated in or externally fitted to personal computers, mobile computers, cellular phones, personal digital assistants (PDAs), peripheral devices therefor (such as mouses, scanners, and printers), and other digital appliances. Thus, it is possible not only to build a camera by the use of an image-taking apparatus, but also to incorporate an image-taking apparatus in various appliances to provide them with a camera capability.

Figure 23:
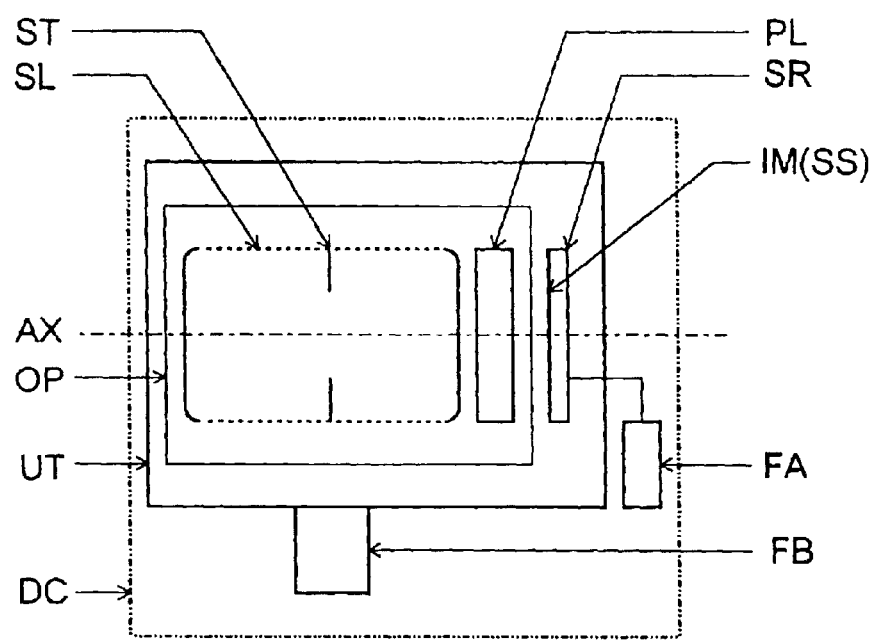
FIG. 23 is a diagram schematically showing an outline of the optical construction of an image-taking apparatus embodying the invention.

FIG. 23 shows a typical example of the construction of an image-taking apparatus. This image-taking apparatus UT is composed of, from the object (subject) side thereof, an image input optical system OP that forms an optical image IM (image surface) on the light-receiving surface SS of an image sensor SR, and an image sensor SR that converts the optical image formed by the image input optical system OP into an electrical signal. The image-taking apparatus UT is used in a form incorporated in a camera DC. The image input optical system OP is composed of a taking lens system SL that functions as an imaging optical system having an optical power for forming the optical image, and a parallel-surface plate PL having no optical power. The taking lens system SL includes a plurality of lens elements, an aperture stop ST, and other components, and the parallel-surface plate PL includes optical filters (such as an optical low-pass filter and an infrared cut filter), the cover glass of the image sensor SR., and other components.

Used as the image sensor SR is, for example, a solid-state image sensor such as a CCD (charge-coupled device) or a CMOS (complementary metal-oxide semiconductor) sensor composed of a plurality of pixels. The light-receiving surface SS of the image sensor SR is flat, and the optical image formed on the light-receiving surface SS of the image sensor SR by the image input optical system OP is converted into an electrical signal by the image sensor SR. The signal produced by the image sensor SR is subjected to predetermined digital image processing, image compression processing, and other processing as necessary, and is recorded in a memory (such as a semiconductor memory or an optical disk) as a digital video signal; in some cases, the signal is transferred to another appliance through a cable or after being converted into an infrared signal. The digital image processing, image compression processing, and other processing mentioned above may be performed within the image-taking apparatus UT, or may be performed in an image processing circuit FA (described later) or the like that is incorporated along with the image-taking apparatus UT in the camera DC.

The optical image to be formed by the image input optical system OP passes through the optical low-pass filter (corresponding to the parallel-surface plate PL) having a predetermined cutoff frequency characteristic that depends on the pixel pitch of the image sensor SR, and meanwhile the optical image has its spatial frequency characteristic so adjusted as to minimize so-called aliasing noise generated when the optical image is converted into an electrical signal. This helps suppress the appearance of a moiré image as appears when a subject pattern having a higher frequency than the pixel pitch is shot. Used as the optical low-pass filter is a birefringence-type low-pass filter, phase-type low-pass filter, or low-pass filter of any other type. Examples of birefringence-type low-pass filters include those made of a birefringent material such as quartz having an appropriately aligned crystal axis and those composed of wavelength plates or the like, which change the polarization plane, laid on one another. Examples of phase-type low-pass filters include those that achieve required optical cut-off frequency characteristics by exploiting diffraction. On the other hand, the infrared cut filter (corresponding to the parallel-surface plate PL) prevents the high sensitivity of the image sensor SR to infrared light from hampering correct color reproduction.

Figure 19A:
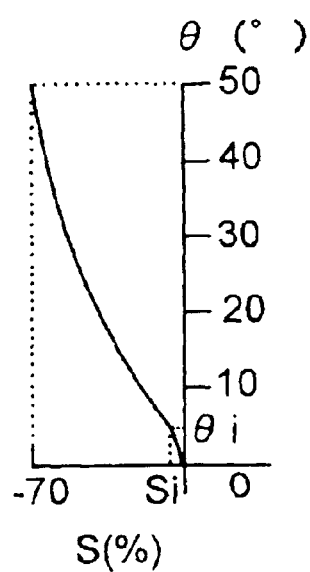
FIGS. 19A and 19B are graphs showing an example of the distortion characteristics of the taking lens system.
Figure 19B:
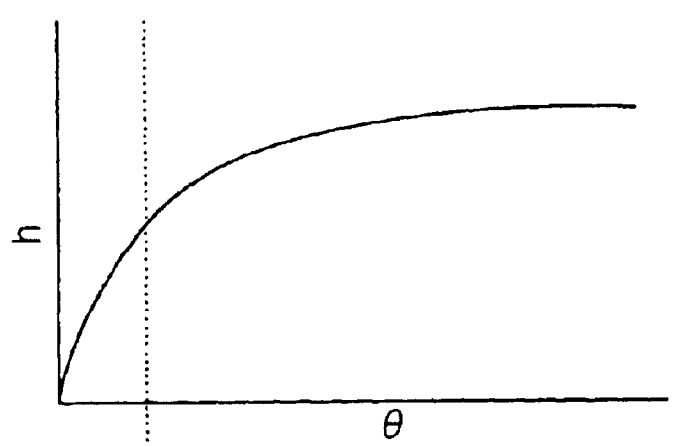

FIGS. 19A and 19B show an example of the distortion characteristics of the taking lens system SL. FIG. 19A is a graph showing the distortion plotted the against angle of view, with the distortion S (%) taken along the horizontal axis and the half view angle θ (°) taken along the vertical axis. FIG. 19B is a graph showing the angle of view plotted against the image height, with the half view angle θ taken along the horizontal axis and the image height h taken along the vertical axis. As FIG. 19A shows, in the region where the half view angle θ is equal to or smaller than a predetermined value θi, the distortion S is smaller than a predetermined value Si, and, as the half view angle θ increases over the predetermined value θi, the distortion S sharply increases, until the distortion S becomes −70% at a half view angle of 50°. Here, the predetermined value Si of the distortion S is a value at which the subject image appears natural without distortion. For example, Si≈3% (then θi≈8°). Needless to say, the predetermined value Si may be any value equal to or smaller than 3% (for example, about 2% or about 1%), because, at such a value, the subject image appears natural without distortion.

As FIG. 19B shows, in the region where the half view angle θ is small (in the region on the left of the dotted line), the image height h varies approximately linearly with respect to the half view angle θ, and the image height h varies at a comparatively high rate per unit variation in the half view angle θ. On the other hand, in the region where the half view angle θ is large (in the region on the right of the dotted line), the image height h varies nonlinearly with respect to the half view angle θ, and the image height h varies at increasingly low rates per unit variation in the half view angle θ, until it is saturated at a approximately constant value. This indicates that resolution is high in the region where the angle of view is small and resolution is low in the region where the angle of view is large. In this way, the taking lens system SL has the advantages of having a wide angle of view, having high resolution in the region of interest, and producing a natural image with no apparent distortion in the region of interest.

When the image-taking apparatus UT (FIG. 23) described above is used to build a digital camera, surveillance camera, or the like, the image-taking apparatus UT is usually housed inside the body of the camera DC. However, the camera capability may be realized in any other manner to suit the given application. For example, the image-taking apparatus UT may be built as a unit so as to be detachably or rotatably attached to the body of a camera DC, or may be built as a unit so as to be detachably or rotatably attached to a digital appliance such as a cellular phone or personal digital assistant.

Figure 20A:
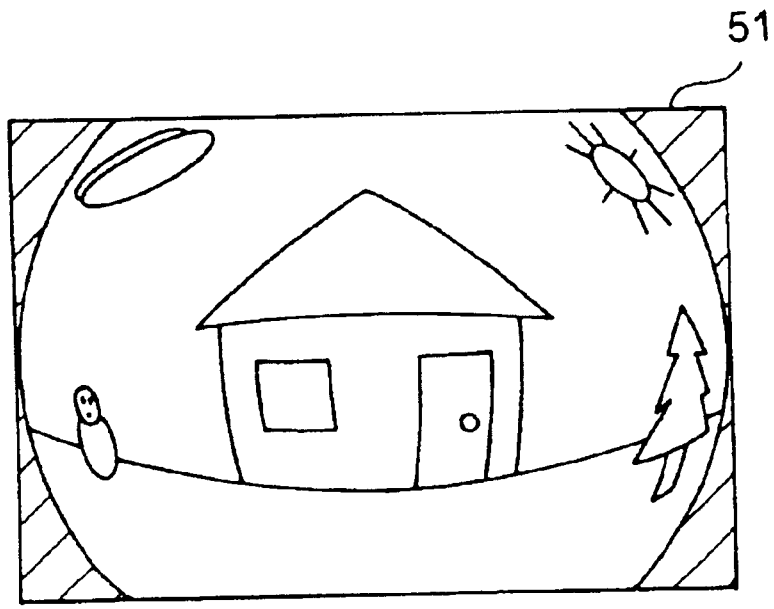
FIGS. 20A and 20B are diagrams showing an example of images before and after correction of distortion.
Figure 20B:
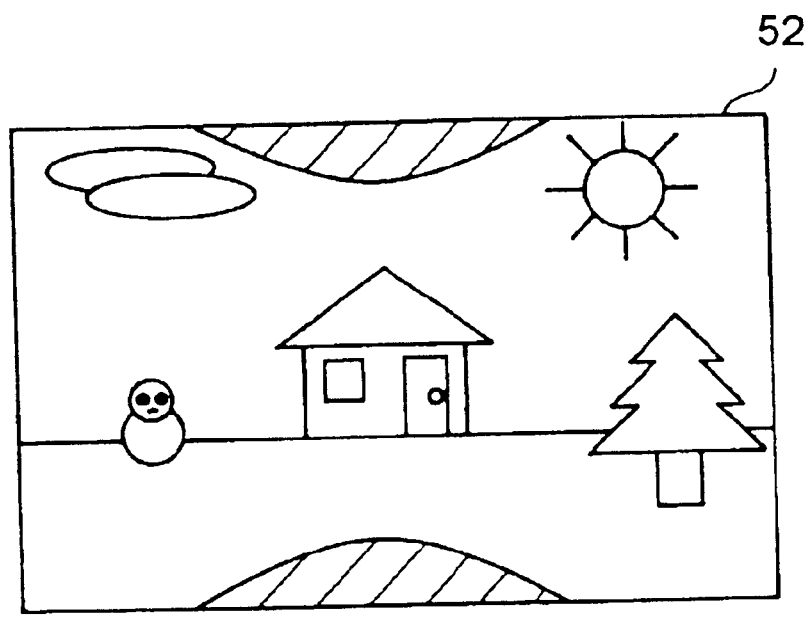
Figure 24:
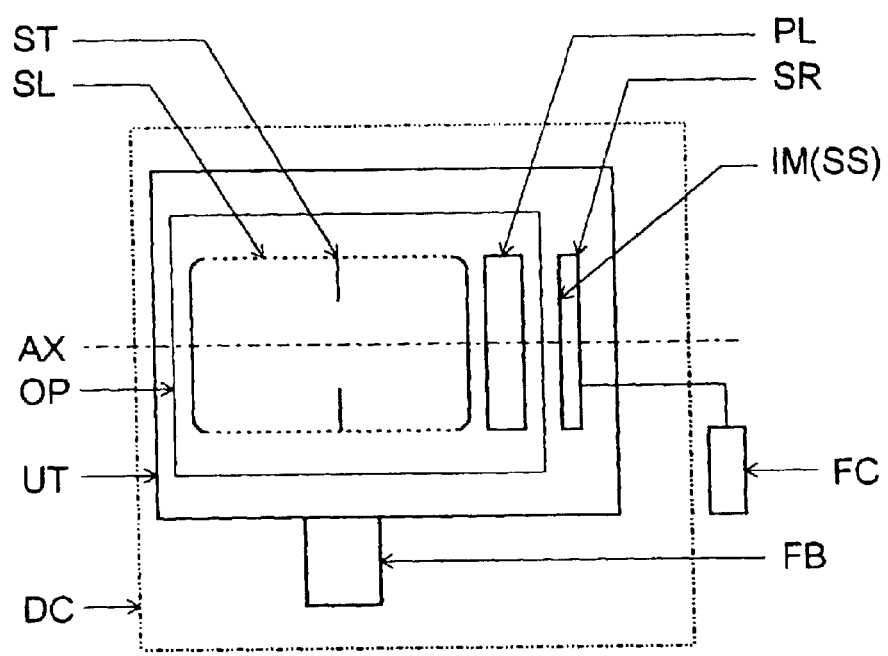
FIG. 24 is a diagram schematically showing an outline of the optical construction of an image-taking apparatus provided with an externally fitted image processing apparatus.

The camera DC (FIG. 23) is provided with, along with the image-taking apparatus UT, an image processing circuit FA or the like. The image processing circuit FA is a circuit that corrects the distortion of the image formed on the light-receiving surface SS of the image sensor SR. It is easy to know the distortion characteristics (FIG. 19) of the taking lens system SL described above, and therefore, by inversely converting the distortion, it is possible to correct the distortion produced by the taking lens system SL and thereby convert the distorted image into a largely distortionless image. This is achieved, for example, by mapping, through appropriate calculations, the pixel positions on the shot image to the corresponding pixel positions on a distortionless image. Since the image is compressed in a peripheral portion thereof, inverse conversion is beset with shortage of information. It is, however, possible to interpolate the image by one of the various known image interpolation methods (such as nearest-neighbor interpolation or bicubic interpolation). The factor of compression by which the taking lens system compresses the image in a peripheral portion thereof is higher than in conventional projection methods, and thus, as described above, the taking lens system has low resolution in a peripheral portion of the image. From a different perspective, this means that the total amount of information that needs to be handled is small. As a result, while conventionally it is difficult to correct distortion on a real-time basis because of an unsatisfactory processing speed, with the optical construction according to the present invention it is possible to quicken the processing speed and thereby improve the frame rate of the moving picture. Moreover, through image processing, including distortion correction, resolution conversion, and other processing, performed by the image processing circuit FA, the image distorted with distortion can be corrected to a natural image without apparent distortion which is similar to the scene perceived by the human eye. Here, the image processing, including distortion correction, resolution conversion, and other processing, may be performed by an image processing apparatus FC (FIG. 24) that is externally fitted to the camera DC. The image processing apparatus FC is a dedicated processor composed of circuits that executes a predetermined procedure, or an apparatus that executes a predetermined procedure as a software program is run on it. FIGS. 20A and 20B show an example of images before and after correction of distortion. FIG. 20A shows an image 51 before correction of distortion (i.e., the shot image), and FIG. 20B shows an image 52 after correction of distortion (i.e., the distortion-corrected image).

The camera DC (FIG. 23) is provided with, along with the image-taking apparatus UT, a pan/tilt mechanism FB or the like. The pan/tilt mechanism FB is a mechanism that permits the image input optical system OP to pan and tilt. Thus, this mechanism, by permitting the image input optical system OP to pan and tilt along with the image-taking apparatus UT, permits the region of interest to be always sensed with the image center region of the image input optical system OP, where it has high resolution.

The taking lens system has the characteristic of compressing the image by a higher compression factor in a peripheral portion thereof than in a central portion thereof by a higher degree than a conventional fish-eye lens or the like. Consequently, the amount of information obtained with respect to the pixels in a peripheral portion of the light-receiving surface of the image sensor is small, resulting in low spatial resolution in a peripheral portion of the image. This inconvenience can be effectively overcome by permitting the image-taking apparatus to rotate at least in one direction (for example, by permitting it to at least pan or tilt) and thereby permitting the shooting direction to change so that the region of interest is always sensed with the image center region with high resolution. This capability is useful in an image-taking apparatus that is used for surveillance purposes. For example, surveillance is performed over a wide angle of view at ordinary time, and, when a movement is detected in a peripheral portion, where resolution is low, the detected region is panned or tilted into the image center region, where resolution is high. This permits more efficient surveillance than a surveillance camera that is rotating all the time. Moreover, since the mechanical parts are used less frequently, it is possible to achieve higher durability. Even in comparison with a surveillance camera with an optical zooming capability, it is possible to achieve lower costs. When a surveillance camera with an optical zooming capability is surveying at the telephoto end, it cannot simultaneously observe over a wide angle of view. By contrast, the camera DC can, with its taking lens system, observe over a wide angle of view and in a telephoto region simultaneously.

Figure 1:
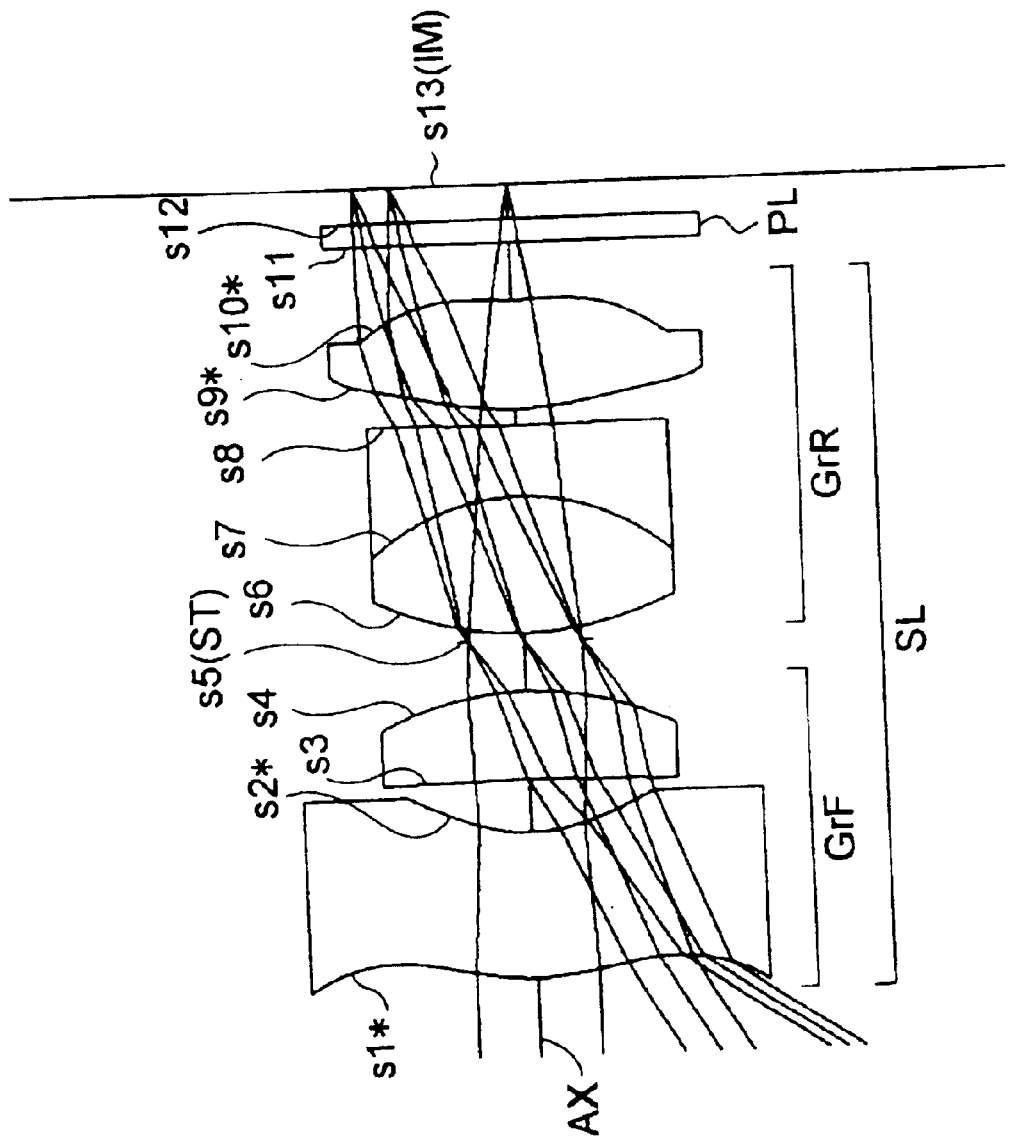
FIG. 1 is an optical construction diagram of a first embodiment (Example 1) of the invention.
Figure 2:
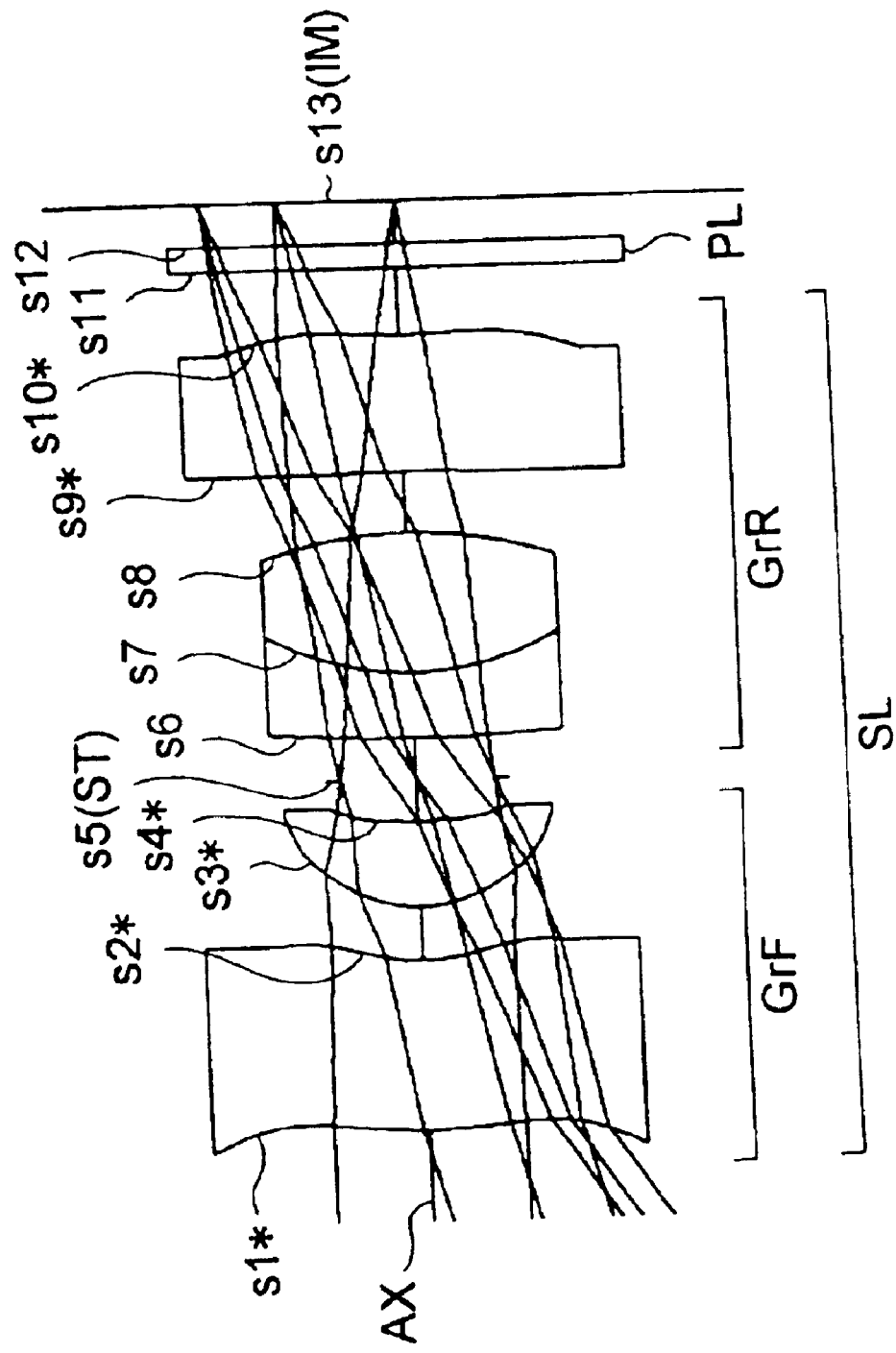
FIG. 2 is an optical construction diagram of a second embodiment (Example 2) of the invention.
Figure 3:
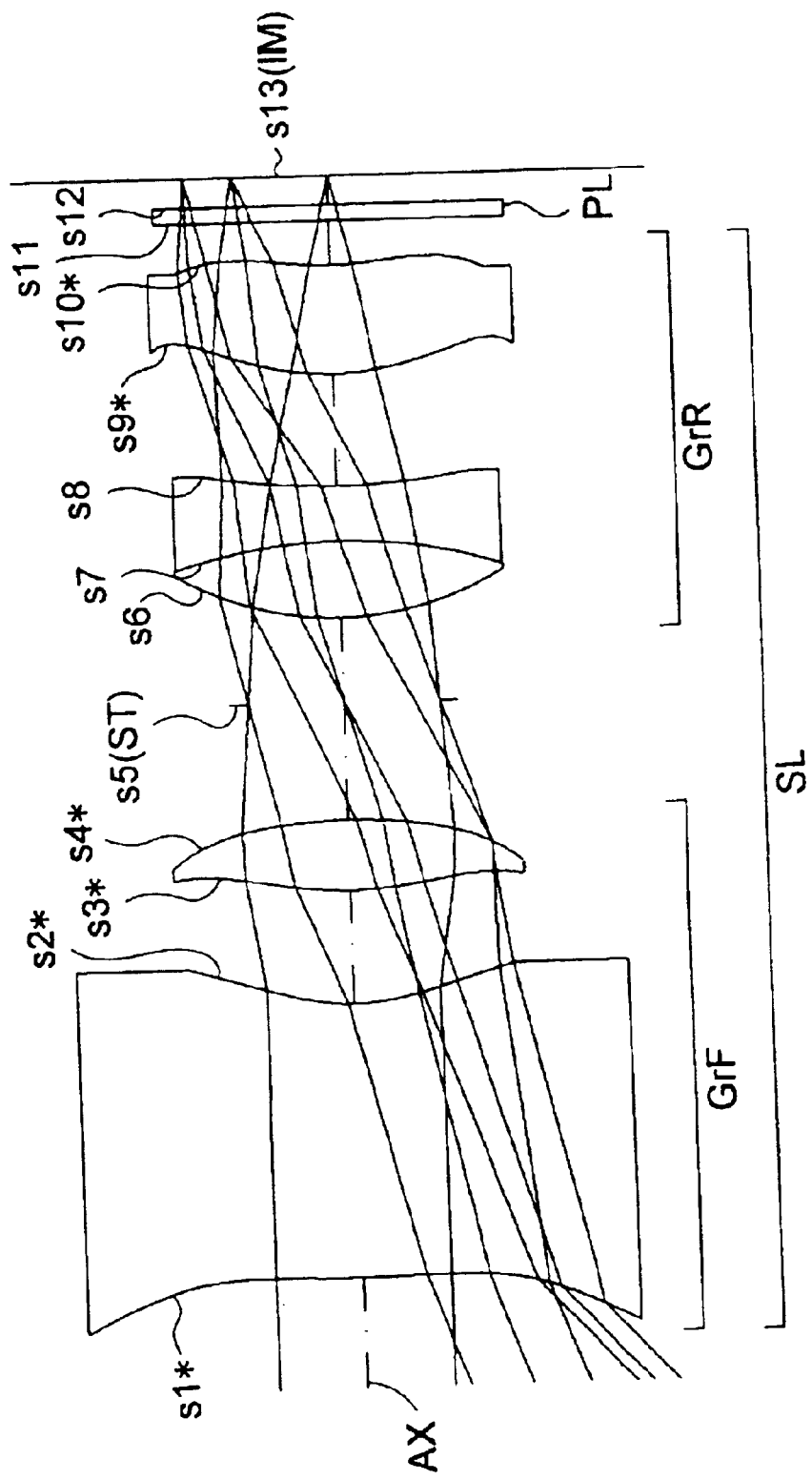
FIG. 3 is an optical construction diagram of a third embodiment (Example 3) of the invention.
Figure 4:
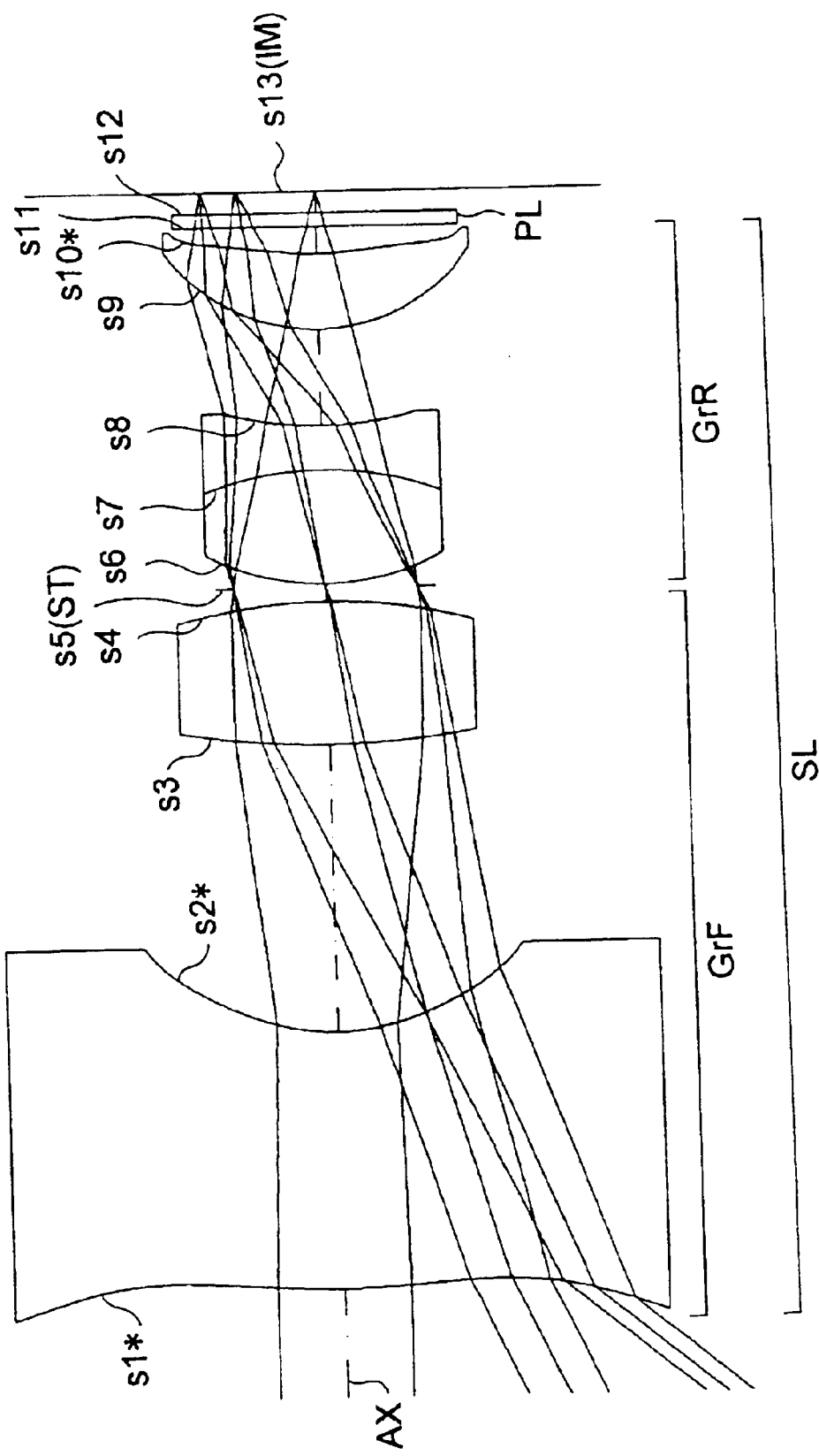
FIG. 4 is an optical construction diagram of a fourth embodiment (Example 4) of the invention.
Figure 5:
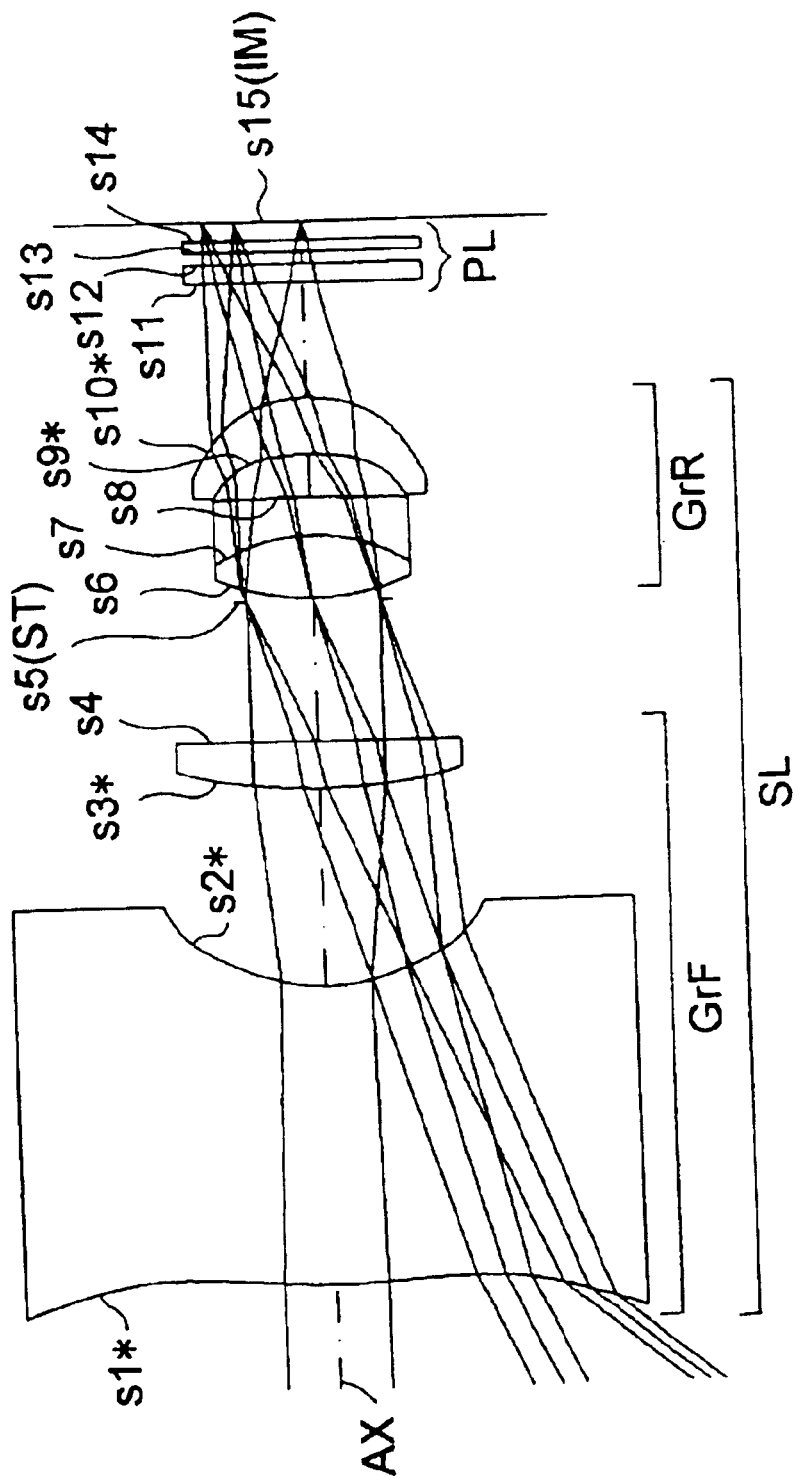
FIG. 5 is an optical construction diagram of a fifth embodiment (Example 5) of the invention.
Figure 6:
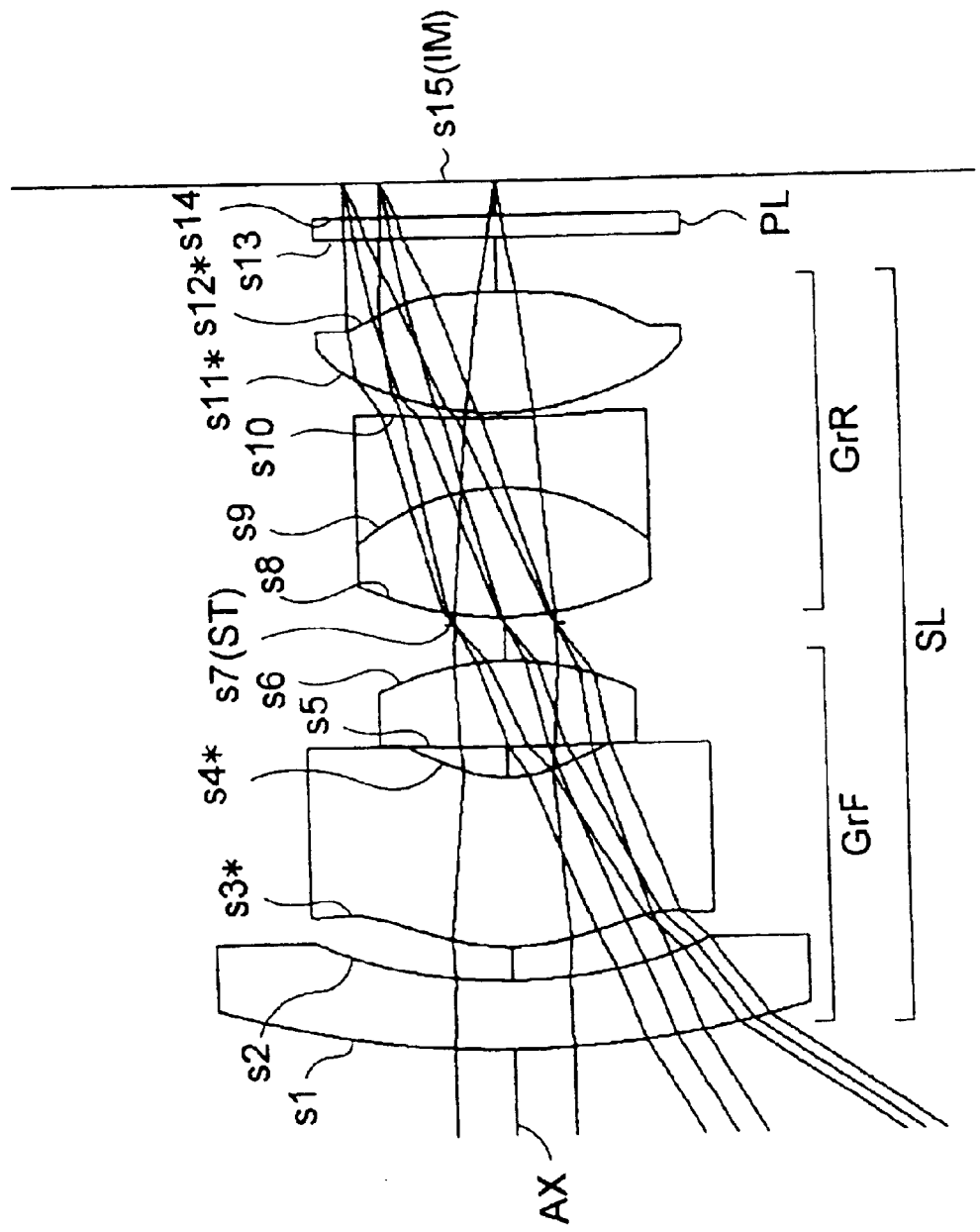
FIG. 6 is an optical construction diagram of a sixth embodiment (Example 6) of the invention.
Figure 7:
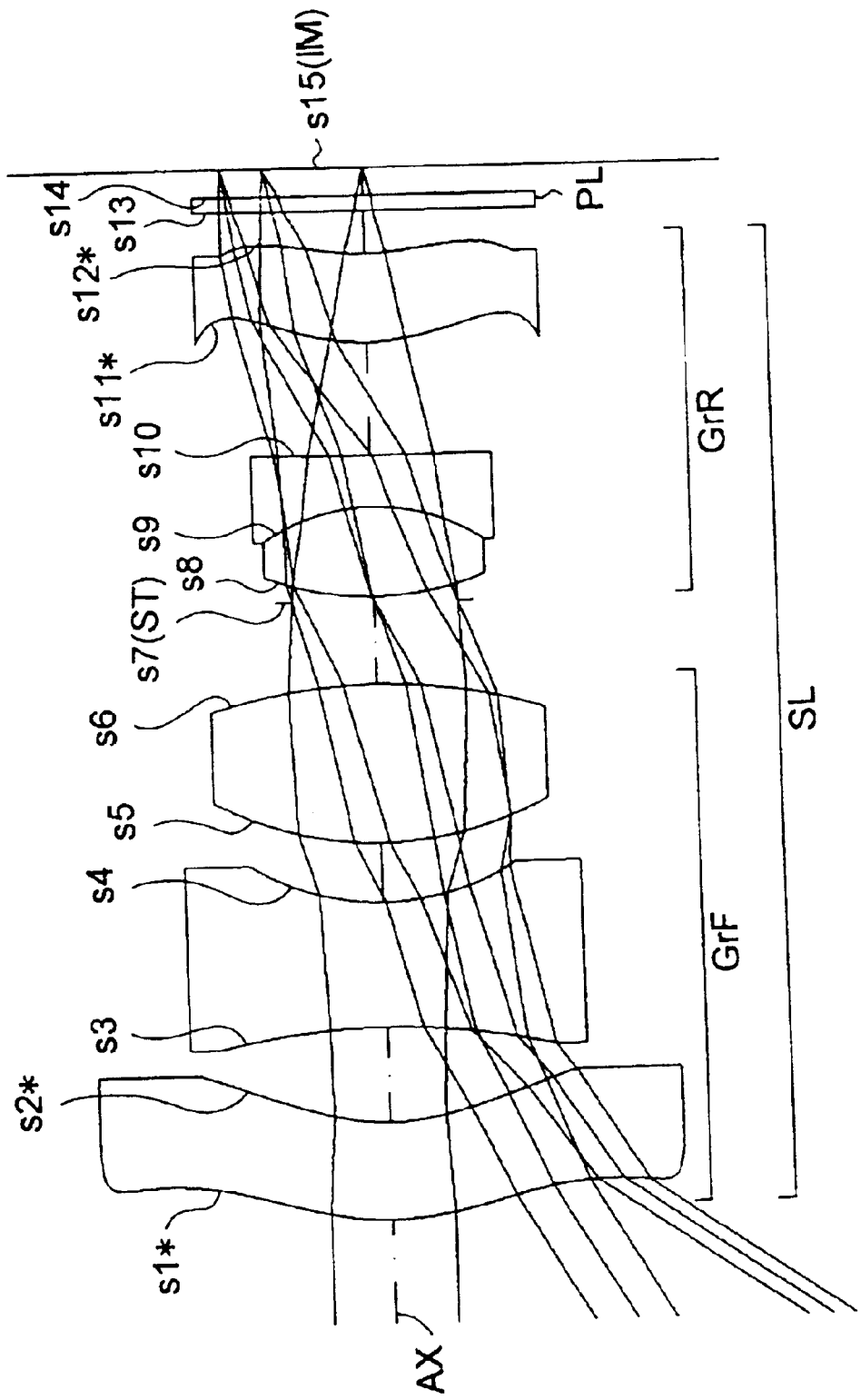
FIG. 7 is an optical construction diagram of a seventh embodiment (Example 7) of the invention.
Figure 10C:
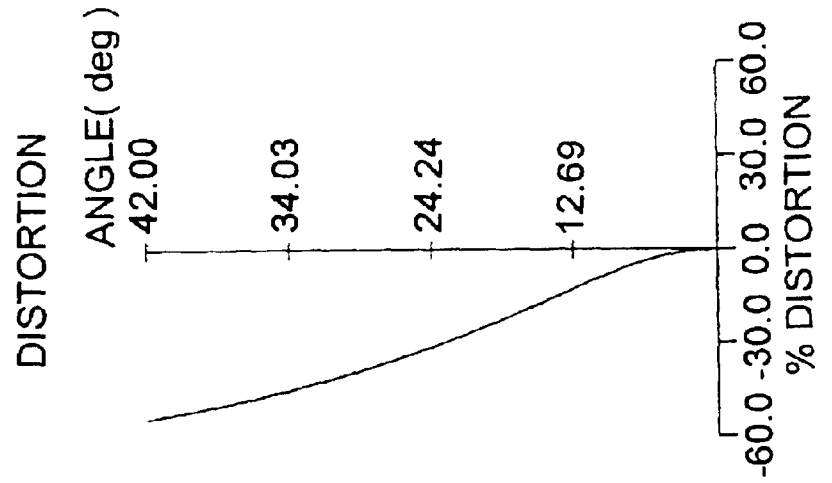
FIGS. 10A to 10C are aberration diagrams of Example 3.
Figure 10B:
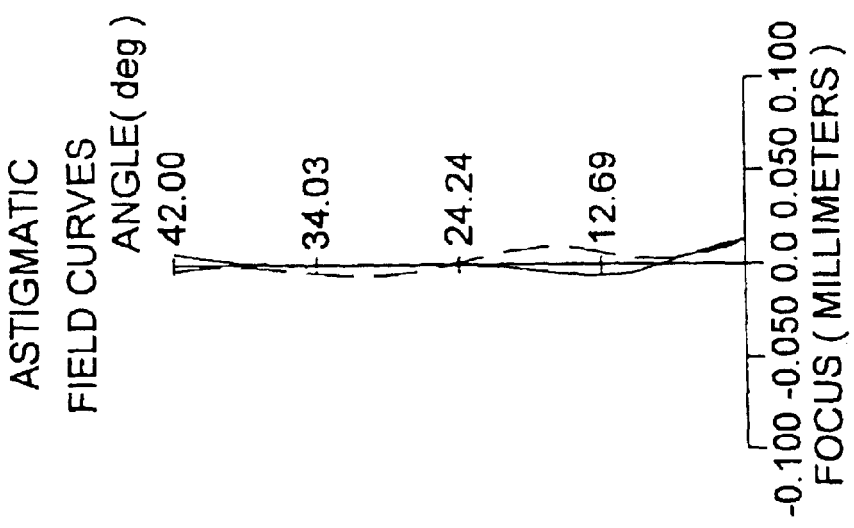
Figure 10A:
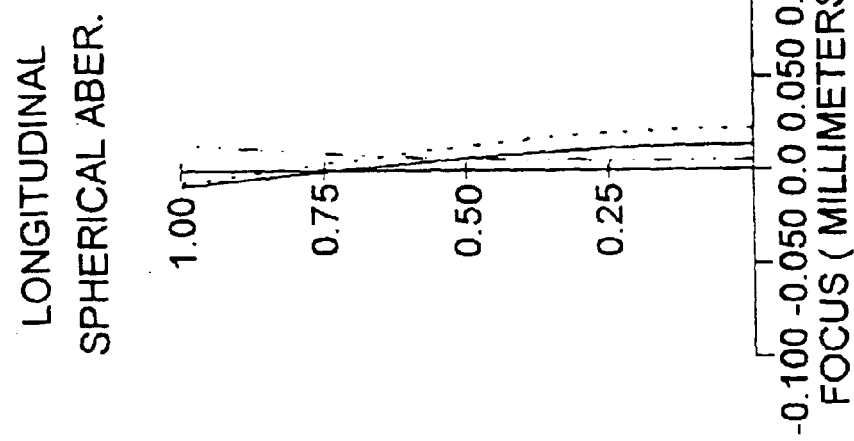
Figure 15:
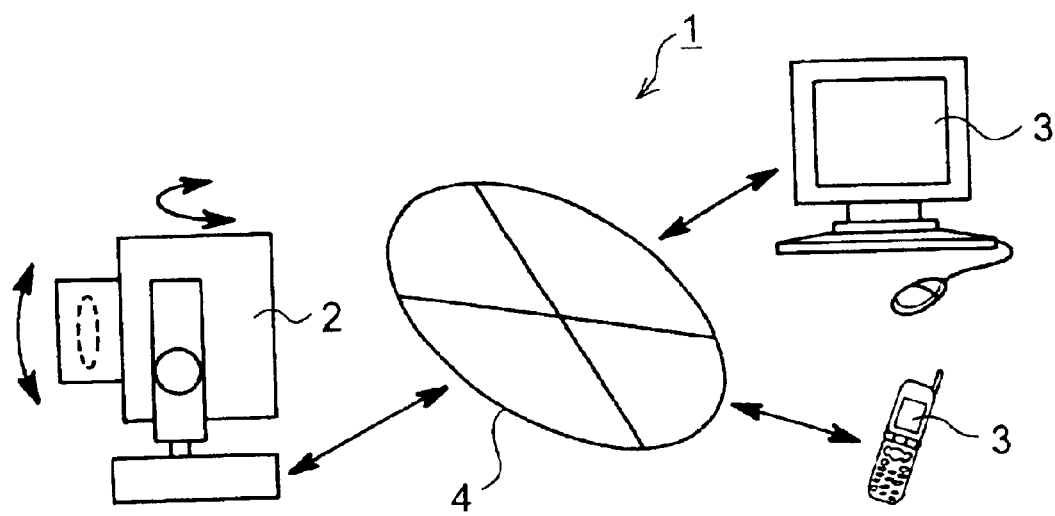
FIG. 15 is a diagram schematically showing an example of the configuration of a surveillance system.

Now, an example of the configuration of a surveillance camera incorporating the image-taking apparatus UT described above, a surveillance system employing such a surveillance camera, and the like will be described. FIG. 15 shows an example of the configuration of a surveillance system. The surveillance system 1 shown in FIG. 15 is provided with a surveillance camera 2 that shoots a predetermined surveillance target region, and a controller 3 such as a personal computer or cellular phone. The surveillance camera 2 and the controller 3 are connected together over a communications network 4.

The surveillance camera 2 shoots the surveillance target, and transmits the image data of its image over the communications network 4 to the controller 3. On the other hand, the controller 3, on receiving an operation command directed to the surveillance camera 2 (for example, a command to change the shooting direction) entered by the user, transmits the operation command over the communications network 4 to the surveillance camera 2. The surveillance camera 2 operates according to the operation command. The image shot by the surveillance camera 2 is displayed on the display portion of the controller 3, and therefore the user, while viewing it, can remotely control the surveillance camera 2.

Figure 16:
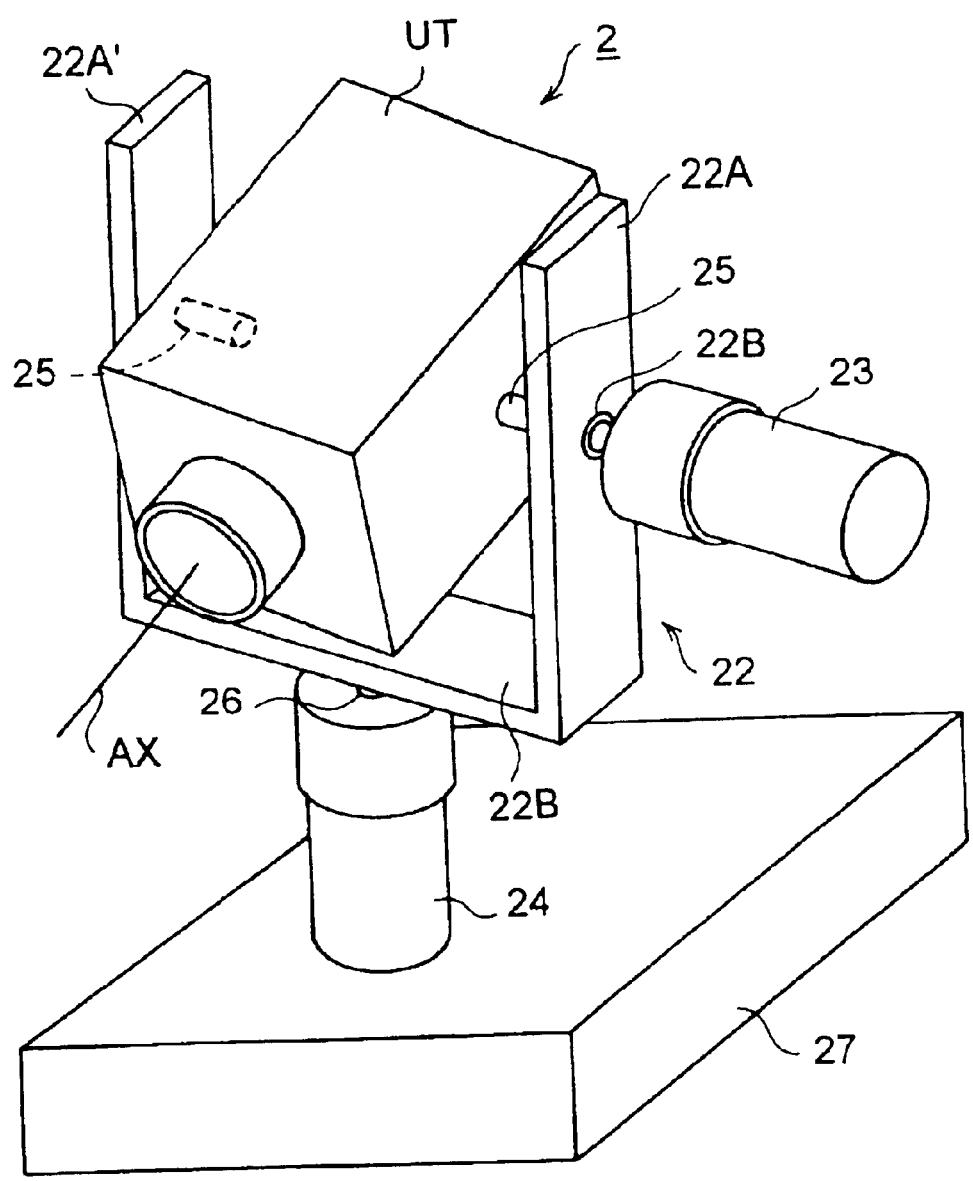
FIG. 16 is a perspective view showing an example of the construction of a surveillance camera used in the surveillance system.

FIG. 16 shows an example of the configuration of the surveillance camera 2 employed in the surveillance system 1. The surveillance camera 2 shown in FIG. 16 is provided with an image-taking apparatus UT, a frame member 22 bent in a U-shape, a geared motor 23 that permits the optical axis AX (corresponding to the shooting direction, or surveillance direction) of the image-taking apparatus UT to move in the up/down direction (tilt direction), and a geared motor 24 that permits the optical axis AX of the image-taking apparatus UT to move in the right/left direction (pan direction).

The image-taking apparatus UT has tilt-direction shafts 25 provided on its left and right side faces so as to project therefrom sideways, and is fitted to the frame member 22 with those tilt-direction shafts 25 put through holes 22B formed in the side faces 22A and 22A' of the frame member 22. To the tip of the shaft 25 projecting through the side face 22A is fitted the output spindle of the geared motor 23. The frame member 22 has a pan-direction shaft 26 provided at the center of its bottom face so as to project therefrom downward. To the tip of this shaft 26 is fitted the output spindle of the geared motor 24. The casing of the geared motor 23 is fixed to the frame member 22 with a fixing member (not shown) so as to be rotatable along with the frame member 22 in the pan direction. The geared motor 24 is fixed to a support member 27 of the surveillance camera 2.

As the geared motor 24 is driven to rotate, the frame member 22 rotates about the shaft 26, and thereby permits the optical axis AX of the image-taking apparatus UT to move in the pan direction. The resulting movement of the surveillance camera 2 is "panning." On the other hand, as the geared motor 23 is driven to rotate, the image-taking apparatus UT rotates about the shaft 25, and thereby permits the optical axis AX of the camera 2 to move in the tilt direction. The resulting movement of the surveillance camera 2 is "tilting."

Figure 17:
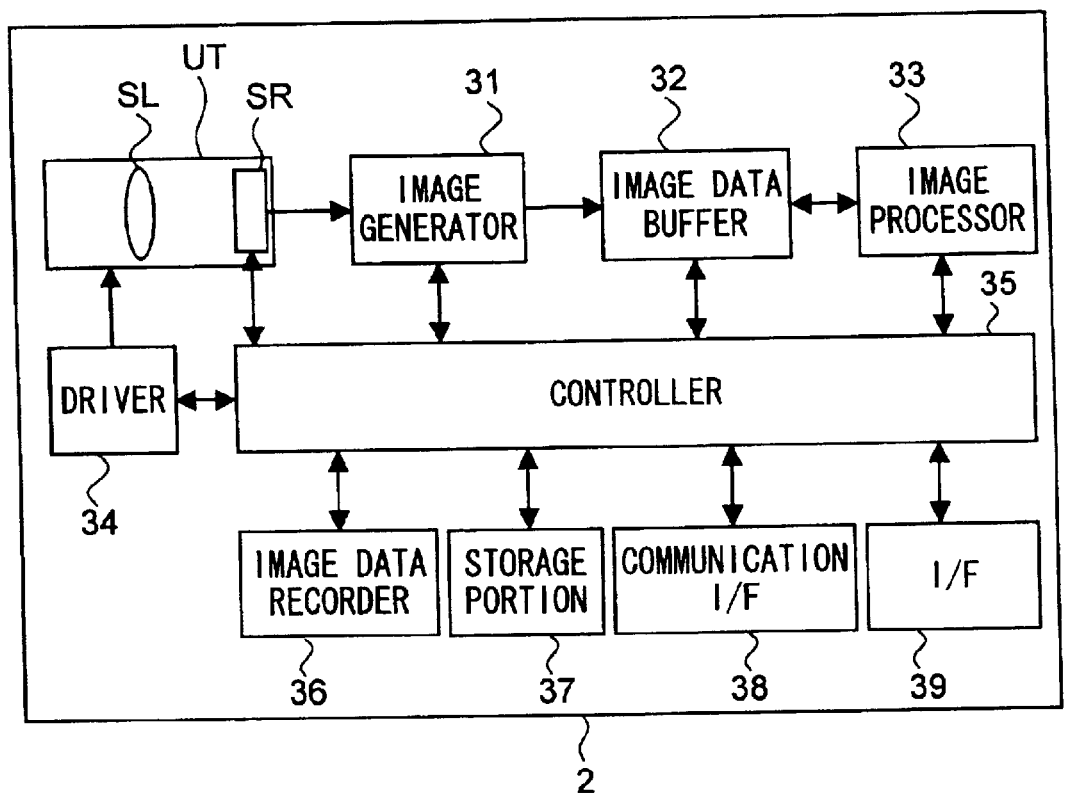
FIG. 17 is a block diagram showing the system configuration of the surveillance camera.

FIG. 17 is a block diagram showing the system configuration of the surveillance camera 2. The surveillance camera 2 is composed of an image-taking apparatus UT, an image generator 31, an image data buffer 32, an image processor 33 (corresponding to the image processing circuit FA described earlier), a driver 34, a controller 35, an image data recorder 36, a storage portion 37, a communication I/F (interface) 38, and an I/F 39.

The image-taking apparatus UT is provided with the taking lens system SL, image sensor SR, and other components as described earlier. The image sensor SR used here is a photoelectric conversion device that has a plurality of photoreceptive elements, each converting the light incident thereon into an electrical signal commensurate with the intensity of the light, in a two-dimensional array (such as in a honeycomb-like or matrix-like formation). On the light-receiving surface of the image sensor SR, there are arranged R (red), G (green), and B (blue) color filters in a ratio of 1:2:1 (the image sensor SR does not necessarily have to be of a fill-color type, but may be of a monochrome type). The image sensor SR converts the optical image of the subject into electrical signals (image signals) composed of R, G, and B color components, and feeds them individually, as image signals of R, G, and B colors, to the image generator 31. The operations performed by the image sensor SR to achieve image sensing, namely starting and stopping of exposure, reading of the output signals of the individual pixels (horizontal synchronization, vertical synchronization, and signal transfer), and other operations, are controlled by the controller 35.

The image generator 31 subjects the whole image to image processing, such as determination of the appropriate black level, gamma correction, white balance (WB) adjustment, edge correction, and color unevenness correction, and thereby generates image data for the individual pixels from the image signals. The image data generated by the image generator 31 is fed to the image data buffer 32. The image data is composed of many sets, corresponding one-to-one to the individual pixels, of position data that represents the positions of the pixels and brightness data that represents the brightnesses of the pixels. The brightness data is composed of, in a case where the surveillance camera 2 shoots on a monochrome basis, the brightness values for the individual pixels and, when the surveillance camera 2 shoots on a full-color basis, the brightness values of each of the R, G, and B color components for the individual pixels or one of those brightness values combined with the color difference values between them.

The image data buffer 32 is a memory (RAM or the like) that is used to temporarily store the image data and that is used as a work area when the image data is proceed by the image processor 33. The image processor 33 is a circuit that subjects the image data stored in the image data buffer 32 to image processing, such as distortion correction and resolution conversion. Here, through distortion correction, the image distorted with distortion (the shot image 51 shown in FIG. 20A) is corrected to a natural image without apparent distortion which is similar to the scene perceived by the human eye (the distortion-corrected image 52 shown in FIG. 20B). In the distortion correction performed here, to exploit the characteristics of the taking lens system SL, the portion of the image in a central region thereof is used intact without being subjected to distortion correction, and only the portion of the image in a peripheral region thereof is subjected to distortion correction.

The driver 34 includes the geared motors 23 and 24, and drives the optical axis AX of the image-taking apparatus UT to move in the pan and tilt directions according to a control signal fed from the controller 35. The image data recorder 36 is a circuit that records the image data stored in the image data buffer 32 onto a recording medium (for example, an optical disk such as a CD-R, a magnetic disk such as a hard disk, a memory card, a semiconductor memory, or the like). The storage portion 37 is a storage circuit that stores various programs necessary for the surveillance camera 2 to operate, data required during the execution of the programs, and data generated during the execution of the programs, and includes a ROM, a RAM, and the like.

The communication I/F 38 is an interface that achieves communication between the surveillance camera 2 and the communications network 4, and performs transmission of communication packets containing image data to the controller 3, reception of communication packets containing operation commands from the controller 3, and other operations. The I/F 39 is an interface that achieves exchange of image data with an external device, and is designed as, for example, an interface complying with a standard such as USB or IEEE 1394. The controller 35 includes a microprocessor or the like, and controls the individual functional blocks described above.

Figure 18:
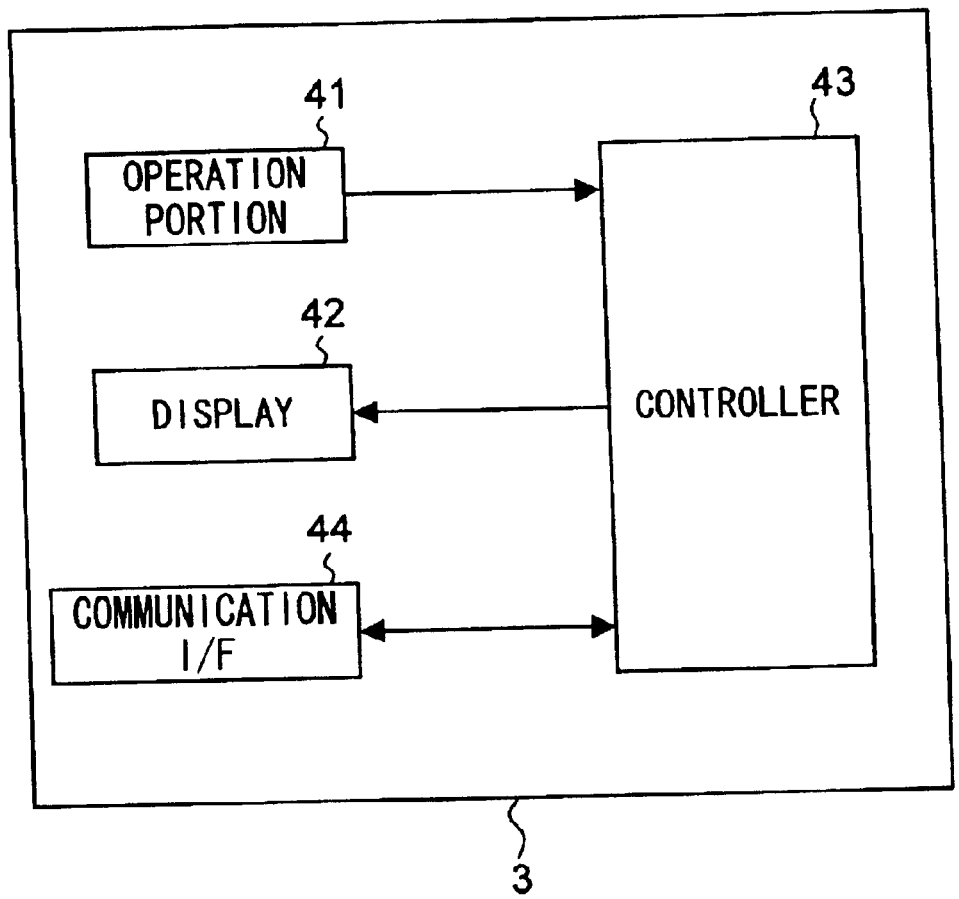
FIG. 18 is a block diagram showing the system configuration of the controller.

FIG. 18 is a block diagram showing the system configuration of the controller 3. The controller 3 is provided with an operation portion 41, a display 42, a controller 43, and a communication I/F 44. The operation portion 41 is a device that permits entry of operation commands for making the surveillance camera 2 perform various operations (such as panning, tilting, and requesting recording and transmission of image data). The operation portion 41 corresponds, for example when the controller 3 is a personal computer, to a keyboard and a mouse and, when the controller 3 is a cellular phone, to numerical and cursor keys. The display 42 is a display for displaying the image transmitted from the surveillance camera 2 over the communications network 4. The display 42 corresponds, for example when the controller 3 is a personal computer, to a CRT or LCD monitor and, when the controller 3 is a cellular phone, to an LCD panel.

The communication I/F 44 is an interface that achieves communication between the controller 3 and the communications network 4, and performs reception of communication packets containing image data from the surveillance camera 2, transmission of communication packets containing operation commands to the surveillance camera 2, and other operations. The controller 43 is, for example, a microcomputer provided with a ROM for storing a control program for controlling the controller 3 and a RAM for temporarily storing data. The controller 43 controls the operation portion 41, the display 42, and the communication I/F 44 appropriately and thereby controls the operation of the controller 3 as a whole.

Next, the optical construction of the image input optical system OP including the taking lens system SL will be described. FIGS. 1 to 7 show the optical constructions of a first to a seventh embodiment, respectively, of the invention. These optical construction diagrams each show, in an optical section, the lens arrangement, optical path, and other features of the respective image input optical system OP. In each optical construction diagram, si (i=1, 2, 3, . . . ) represents the i-th surface as counted from the object side, and a surface of which the reference symbol si is marked with an asterisk (*) is an aspherical surface. In all the embodiments, the taking lens system SL is a single-focal-length lens system, and, on its image side, there is arranged a parallel-surface plate PL that corresponds to optical filters and the like.

The most significant feature of the first to fifth and seventh embodiments (FIGS. 1 to 5 and 7) is that the most object-side lens surface of the taking lens system SL is an aspherical surface that is so shaped as to have a positive optical power in a central portion thereof and a negative optical power in a peripheral portion thereof. The most significant feature of the first to fourth, sixth, and seventh embodiments (FIGS. 1 to 4, 6, and 7) is that the taking lens system SL is composed of a front lens unit GrF and a rear lens unit GrR with an aperture stop ST disposed in between, with the front and rear lens units GrF and GrR each having a positive optical power as a whole.

The lens construction of each embodiment will be described below. In the descriptions that follow, the following points should be noted. The optical powers of all lens elements and lens units are given as those observed in the paraxial region. For a single lens element, its optical power as observed with air existing on both sides thereof is given. For single lens elements constituting a cemented lens element, their optical powers as observed with their respective lens media existing on both sides of the cementing surface are given on the basis of their actual optical arrangement. It should be noted that, throughout the present specification, an "optical power" denotes one observed in the paraxial region unless a particular region is specified.

The taking lens system SL included in the image-taking apparatus UT of the first embodiment (FIG. 1) is a single-focal-length lens system of a lens type having a negative-positive-positive-positive optical power arrangement. This taking lens system SL is composed of, from the object side thereof, a first lens unit composed of one negative lens element, a second lens unit composed of one positive lens element, an aperture stop ST, a third lens unit having a positive optical power as a whole and composed of a cemented lens element formed by cementing together a positive lens element and a negative lens element, and a fourth lens unit composed of one positive lens element. The first and second lens unit, which are located on the object side of the aperture stop ST, form a front lens unit GrF having a positive optical power as a whole, and the third and fourth lens unit, which are located on the image side of the aperture stop ST, form a rear lens unit GrR having a positive optical power as a whole. The lens elements constituting the first and fourth lens units each have aspherical surfaces on both sides. Here, to reduce costs, all the lens elements having an aspherical surface are formed of plastic.

The taking lens system SL included in the image-taking apparatus UT of the second embodiment (FIG. 2) is a single-focal-length lens system of a lens type having a negative-positive-positive-negative optical power arrangement. This taking lens system SL is composed of, from the object side thereof, a first lens unit composed of one negative lens element, a second lens unit composed of one positive lens element, an aperture stop ST, a third lens unit having a positive optical power as a whole and composed of a cemented lens element formed by cementing together a weakly-powered positive lens element and a positive lens element, and a fourth lens unit composed of one negative lens element. The first and second lens unit, which are located on the object side of the aperture stop ST, form a front lens unit GrF having a positive optical power as a whole, and the third and fourth lens unit, which are located on the image side of the aperture stop ST, form a rear lens unit GrR having a positive optical power as a whole. The lens elements constituting the first, second, and fourth lens units each have aspherical surfaces on both sides. Here, to reduce costs, all the lens elements having an aspherical surface are formed of plastic.

The taking lens system SL included in the image-taking apparatus UT of the third embodiment (FIG. 3) is a single-focal-length lens system of a lens type having a negative-positive-positive-positive optical power arrangement. This taking lens system SL is composed of, from the object side thereof, a first lens unit composed of one negative lens element, a second lens unit composed of one positive lens element, an aperture stop ST, a third lens unit having a positive optical power as a whole and composed of a cemented lens element formed by cementing together a positive lens element and a negative lens element, and a fourth lens unit composed of one positive lens element. The first and second lens unit, which are located on the object side of the aperture stop ST, form a front lens unit GrF having a positive optical power as a whole, and the third and fourth lens unit, which are located on the image side of the aperture stop ST, form a rear lens unit GrR having a positive optical power as a whole. The lens elements constituting the first, second, and fourth lens units each have aspherical surfaces on both sides. Here, to reduce costs, all the lens elements having an aspherical surface are formed of plastic.

The taking lens system SL included in the image-taking apparatus UT of the fourth embodiment (FIG. 4) is a single-focal-length lens system of a lens type having a negative-positive-positive-positive optical power arrangement. This taking lens system SL is composed of, from the object side thereof, a first lens unit composed of one negative lens element, a second lens unit composed of one positive lens element, an aperture stop ST, a third lens unit having a positive optical power as a whole and composed of a cemented lens element formed by cementing together a positive lens element and a negative lens element, and a fourth lens unit composed of one positive lens element. The first and second lens unit, which are located on the object side of the aperture stop ST, form a front lens unit GrF having a positive optical power as a whole, and the third and fourth lens unit, which are located on the image side of the aperture stop ST, form a rear lens unit GrR having a positive optical power as a whole. The single lens element constituting the first lens unit has aspherical surfaces on both sides, and the single lens element constituting the fourth lens unit has an aspherical surface on the image side. Here, to reduce costs, all the lens elements having an aspherical surface are formed of plastic.

The taking lens system SL included in the image-taking apparatus UT of the fifth embodiment (FIG. 5) is a single-focal-length lens system of a lens type having a negative-positive-positive-positive optical power arrangement. This taking lens system SL is composed of, from the object side thereof, a first lens unit composed of one negative lens element, a second lens unit composed of one positive lens element, an aperture stop ST, a third lens unit having a positive optical power as a whole and composed of a cemented lens element formed by cementing together a positive lens element and a weakly-powered positive lens element, and a fourth lens unit composed of one positive lens element. The first and second lens unit, which are located on the object side of the aperture stop ST, form a front lens unit GrF having a negative optical power as a whole, and the third and fourth lens unit, which are located on the image side of the aperture stop ST, form a rear lens unit GrR having a positive optical power as a whole. The single lens elements constituting the first and fourth lens units each have aspherical surfaces on both sides, and the single lens element constituting the second lens unit has an aspherical surface on the object side. Here, the single lens elements constituting the first and fourth lens units, which have aspherical surfaces on both sides, are made of plastic, which is effective in cost reduction.

The taking lens system SL included in the image-taking apparatus UT of the sixth embodiment (FIG. 6) is a single-focal-length lens system of a lens type having a negative-positive-positive-positive optical power arrangement. This taking lens system SL is composed of, from the object side thereof, a first lens unit composed of two negative lens elements, a second lens unit composed of one positive lens element, an aperture stop ST, a third lens unit having a positive optical power as a whole and composed of a cemented lens element formed by cementing together a positive lens element and a negative lens element, and a fourth lens unit composed of one positive lens element. The first and second lens unit, which are located on the object side of the aperture stop ST, form a front lens unit GrF having a positive optical power as a whole, and the third and fourth lens unit, which are located on the image side of the aperture stop ST, form a rear lens unit GrR having a positive optical power as a whole. The image-side single lens element of the first lens unit and the single lens element constituting the fourth lens unit each have aspherical surfaces on both sides. Here, the single lens element constituting the fourth lens unit, which has aspherical surfaces on both sides, are made of plastic, which is effective in cost reduction.

The taking lens system SL included in the image-taking apparatus UT of the seventh embodiment (FIG. 7) is a single-focal-length lens system of a lens type having a negative-positive-positive-positive optical power arrangement. This taking lens system SL is composed of, from the object side thereof, a first lens unit composed of two negative lens elements, a second lens unit composed of one positive lens element, an aperture stop ST, a third lens unit having a positive optical power as a whole and composed of a cemented lens element formed by cementing together a positive lens element and a negative lens element, and a fourth lens unit composed of one positive lens element. The first and second lens unit, which are located on the object side of the aperture stop ST, form a front lens unit GrF having a positive optical power as a whole, and the third and fourth lens unit, which are located on the image side of the aperture stop ST, form a rear lens unit GrR having a positive optical power as a whole. The object-side single lens element of the first lens unit and the single lens element constituting the fourth lens unit each have aspherical surfaces on both sides. Here, to reduce costs, all the lens elements having an aspherical surface are formed of plastic.

Now, the conditions that should preferably be fulfilled by the taking lens system used in an image-taking apparatus embodying the present invention will be described. To achieve compactness while exploiting the features of the fovea-type design, it is preferable, as in the first to seventh embodiments, the most object-side lens element or the most image-surface-side lens element has an aspherical surface on at least one side. Moreover, it is preferable that the aspherical surface be so shaped as to have a positive optical power near the optical axis AX and a negative optical power in the periphery. In the taking lens system SL, at least one lens surface included in the front lens unit may be an aspherical surface that is so shaped as to have a positive optical power in a central portion thereof and a negative optical power in a peripheral portion thereof. Adopting an aspherical surface having such a shape makes it comparatively easy to obtain a wide angle of view as a whole and simultaneously achieve high definition in a telephoto image in a central image region.

Figure 21:
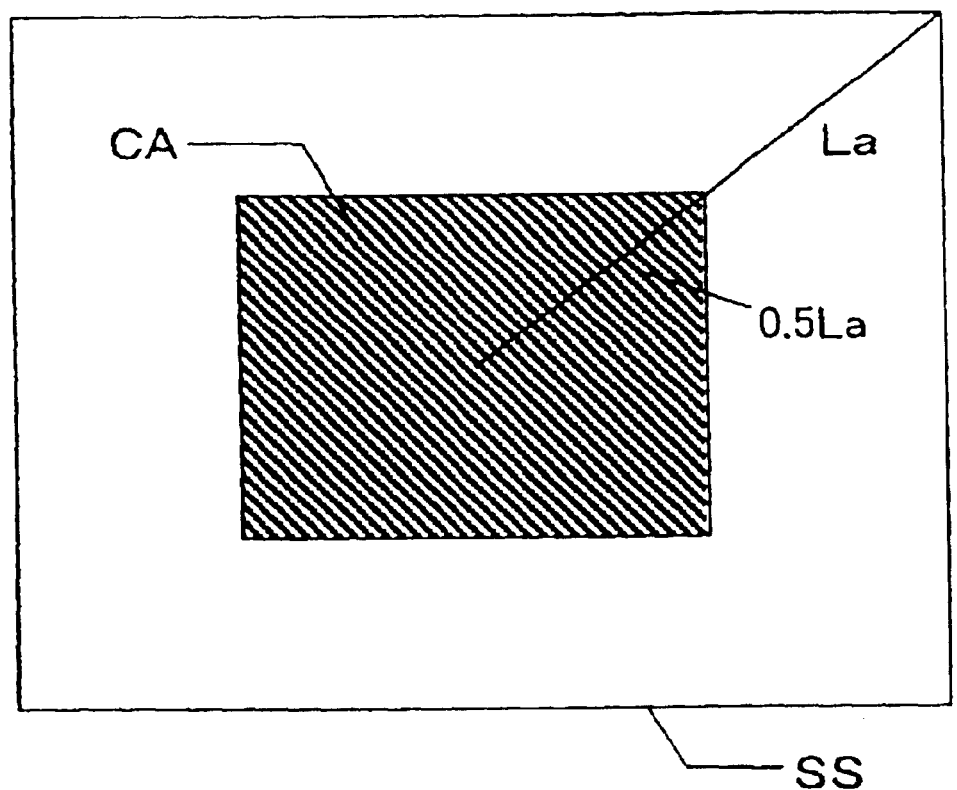
FIG. 21 is a diagram schematically showing the image center region on the light-receiving surface of the image sensor.

By adopting, as the most object-side lens surface of the taking lens system, an aspherical surface that is so shaped as to have a positive optical power in a central portion thereof and a negative optical power in a peripheral portion thereof, it is possible to simultaneously achieve a wide angle of view and a long focal length, which have conventionally been difficult to achieve simultaneously. Moreover, it is possible to obtain, in a image center region, an image enlarged at an enlargement magnification comparable with that achieved at the telephoto end with the standard design adopting optical zooming, and in addition without degrading image quality. It should be noted that the "image center region" here denotes, assuming that the length from the center of the light-receiving surface of the image sensor to a diagonal corner thereof is La, the region on the light-receiving surface of the image sensor located within a diagonal length of 0.5 La of the center thereof. FIG. 21 shows an example of the image center region CA in a case where the light-receiving surface SS of the image sensor is rectangular. Assuming that the length from the center of the light-receiving surface SS of the image sensor to a diagonal corner thereof is La, the region on the light-receiving surface SS located within a diagonal length of 0.5 La of the center thereof is the image center region CA (hatched in the figure).

By using such an aspherical surface as the most object-side lens surface, it is possible to correct, with the maximum effect, off-axial aberrations such as astigmatism and coma. Attempting to obtain the same effects by using an aspherical surface only as the image-side surface of the most object-side lens element, or by using an aspherical surface only in the second lens element from the object side, leads to increasing the total length of the taking lens system and increasing the number of lens elements used therein. It should be noted that the expression used above to define the shape of the aspherical surface is equivalent, in the resulting effects, to defining it as a surface so shaped as to have a point of inflection. That is, by adopting, as the most object-side lens surface of the taking lens system, a surface that is so shaped as to have a point of inflection so that the surface is convex in a central portion thereof and is concave in a peripheral portion thereof, it is possible to simultaneously achieve a wide angle of view and a long focal length, which have conventionally been difficult to achieve simultaneously.

Preferably, the taking lens system SL fulfills condition (1) below.

$$-90 < Da < -20 \tag{1}$$

where

Da represents the distortion (%) observed at the maximum half view angle in the diagonal direction of the light-receiving surface of the image sensor.

Fulfilling condition (1) also is effective in achieving a wide angle of view and a long focal length simultaneously. When condition (I) is fulfilled, it is possible to obtain, in the image center region, an image enlarged at an enlargement magnification comparable with that achieved at the telephoto end with the standard design adopting optical zooming, and in addition without degrading image quality. If the lower limit of condition (1) is disregarded, it is difficult to achieve a wide angle of view and a long paraxial focal length simultaneously, and thus it is difficult to achieve compactness while maintaining a large aperture and high performance. If the upper limit of condition (1) is disregarded, the difference in angle of view between the image center region and the image periphery region is extremely small. Under this condition, to obtain an enlarged image in the image center region, there is no choice but to use a method, such as electronic zooming, that degrades image quality. This makes the taking lens system no different from a common wide-angle single-focal-length lens system having distortion corrected.

More preferably, the taking lens system SL fulfills condition (6) below.

$$-70 < Da < -40 \tag{6}$$

If the lower limit of condition (6) is disregarded, it is necessary either to lower the enlargement magnification in the image center region or to narrow the image center region. If the upper limit of condition (6) is disregarded, the enlargement magnification at which the image can be enlarged without degrading image quality in the image center region is lower than that achieved at the telephoto end with the standard design adopting optical zooming. This lessens the advantage of the fovea-type design over the standard design adopting optical zooming.

By building the taking lens system with a front lens unit and a rear lens unit arranged with an aperture stop disposed in between and giving both of the front and rear lens units positive optical powers, it is possible to greatly reduce the total length, and to reduce the effective apertures of the individual lens elements. This makes it easy to make the image-taking apparatus as a whole compact. Moreover, this optical construction exhibits better symmetry between the front and rear lens units about the aperture stop than a markedly retrofocus-type construction in which the front lens unit, which is disposed on the object side of the aperture stop, has a negative optical power as a whole. This makes easy to correct astigmatism and coma.

In a construction as described above in which the taking lens system has a positive—positive optical power arrangement composed of a front lens unit and a rear lens unit arranged with an aperture stop disposed in between, preferably, condition (7) below is fulfilled and, more preferably, condition (8) is fulfilled.

$$0 < f_f/f_r < 10 \tag{7}$$

$$0.3 < f_f/f_r < 7.5 \tag{8}$$

where $f_f$ represents the focal length of the front lens unit (i.e., the composite focal length of the lens units located on the object side of the aperture stop); and $f_r$ represents the focal length of the rear lens unit (i.e., the composite focal length of the lens units located on the image side of the aperture stop).

If the upper limit of condition (7) is disregarded, it is difficult to achieve a long focal length in the image center region while maintaining a wide angle of view. If the lower limit of condition (7) is disregarded, either the front or rear lens unit has a negative optical power. If the front lens unit has a negative optical power, it is difficult to correct astigmatism and coma ascribable to asymmetry. If the rear lens unit has a negative optical power, the rays incident on the image sensor make large angles with the optical axis. This causes vignetting of rays at the opening restricting the light-receiving surface of the image sensor or in the lens array disposed immediately in front of the image sensor, and thus causes low brightness in the periphery. If the upper limit of condition (8) is disregarded, the optical power of the front lens unit is too weak. This makes it difficult to correct off-axial aberration, in particular coma. If the lower limit of condition (8) is disregarded, the optical power of the front lens unit is so strong that off-axial aberrations are overcorrected. Under either condition, degraded performance results.

Preferably, the taking lens system SL has an air gap provided somewhere between the most image-side lens surface and the light-receiving surface of the image sensor (i.e., the image-sensing surface). This makes it easy to adjust the position of the image sensor and thereby reduce product-to-product variations in performance resulting from variations in the back focal length due to fabrication errors in the taking lens system, lens barrel, and other components. It should be noted that the "most image-side lens element" here denotes the single or cemented lens element that is disposed at the image-side end.

Preferably, the most image-side lens element of the taking lens system SL has a positive optical power. By giving the most image-side lens element a positive optical power, it is possible to make the rays incident on the image sensor close to telecentric. This helps minimize the lowering of brightness that occurs at the opening restricting the light-receiving surface of the image sensor or in the lens array immediately disposed in front of the image sensor.

Preferably, condition (9) below is fulfilled.

$$0° < |\alpha| < 30° \quad (9)$$

where $\alpha$ represents the angle (in degrees) that, among the rays incident on the light-receiving surface of the image sensor, the principal ray at the maximum half view angle in the diagonal direction of the light-receiving surface makes with the optical axis.

If the upper limit of condition (9) is disregarded, even when the lens array is arranged immediately in front of the image-sensing surface, it is difficult to alleviate the lowering of brightness in the periphery. The tower limit of condition (9) means perfect telecentricity. Attempting to reach the lower limit of condition (9) puts an extremely heavy burden on the taking lens system (for example, by requiring an increased number of lens elements).

More preferably, condition (10) below is fulfilled.

$$2° < |\alpha| < 15° \quad (10)$$

If the upper limit of condition (10) is disregarded, unsatisfactory telecentricity makes the lowering of brightness in the periphery apparent. If the lower limit of condition (10) is disregarded, it is difficult to make the taking lens system compact.

Preferably, the taking lens system includes, from the object side thereof, a first lens unit having a negative optical power, a second lens unit having a positive optical power, an aperture stop, and a third lens unit having a positive optical power. A fourth lens unit may have a positive or negative optical power, and more preferably has a positive optical power from the viewpoint of telecentricity. Preferably, each lens unit is composed of one or two single lens elements or one pair of lens elements cemented together. This construction makes it possible to realize a compact taking lens system composed of about four to six lens elements while obtaining a sufficient back focal length, correcting various aberration satisfactorily, and achieving telecentricity in the rays incident on the image-sensing surface.

Preferably, the taking lens system has the aperture stop disposed approximately in the middle of the entire system. More preferably, the taking lens system is composed of, from the object side thereof, a first lens unit having a negative optical power, a second lens unit having a positive optical power, an aperture stop, a third lens unit having a positive optical power, and a fourth lens unit having a positive optical power, and in addition the aperture stop is disposed approximately in the middle of the entire system. The closer the aperture stop is disposed to the object-side end of the entire system, the less effective the aspherical surface having a point of inflection becomes in correcting off-axial aberrations. On the other hand, the closer the aperture stop is disposed to the image-side end of the entire system, the less telecentric the rays incident on the image sensor become, resulting in increasingly low brightness in a peripheral portion of the light-receiving surface of the image sensor.

Preferably, in the taking lens system SL, the most image-side lens element and the most object-side lens element are plastic lens elements each having an aspherical surface, the most object-side lens element has a negative optical power, and the most image-side lens element has a positive optical power. This makes it possible to cancel variation in the back focal length resulting from variation in the ambient temperature.

Assuming that the light-receiving surface of the image sensor is rectangular, and that the length from the center of the light-receiving surface to a diagonal corner thereof is La, then, preferably, the taking lens system fulfills condition (11) below.

$$2 < f_{135}/f_{wide} < 10 \quad (11)$$

where $f_{135}$ represents the paraxial focal length f of the entire system as converted into its equivalent value on 35 mm film (in the diagonal direction thereof), specifically, $f_{135} = 21.63 \times f/(0.5 \times La)$;

$f_{wide}$ represents the focal length calculated from the maximum half view angle $\theta v_{max}$ in the direction of the longer sides of the light-receiving surface of the image sensor as converted into its equivalent value on 35 mm film (in the direction of the longer sides thereof), specifically, $f_{wide} = 18/\tan \theta v_{max}$.

What matters with a wide angle of view is the maximum angle of view in the direction of the longer sides, and condition (11) defines the ratio of the paraxial focal length to the angle of view in the longer-side direction. The ratio defined by condition (11) can be regarded as the apparent zoom ratio of a fovea lens. Condition (11) is a formula for use in a case where the image center region has a maximum diagonal length of 0.5 La. Even in a case where the diagonal length is smaller than 0.5 La, it is possible to calculate the apparent zoom ratio of a fovea lens on the same principle. If the lower limit of condition (11) is disregarded, the difference in angle of view between the image center region and the image periphery region is too small. This makes it difficult to differentiate the fovea lens from a conventional single-focal-length lens. If the upper limit of condition (11) is disregarded, the taking lens system has an extremely complicated construction. To avoid this, there is no choice but to narrow the image center region.

More preferably, condition (12) below is fulfilled.

$$2.5 < f_{135}/f_{wide} < 6 \tag{12}$$

If the upper limit of condition (12) is disregarded, the increased enlargement magnification in the image center region requires an increased number of lens elements. This makes it difficult to achieve compactness, and thus lessens the advantages of the fovea-type design in terms of size and costs over taking lens systems adopting optical zooming or the like. If the lower limit of condition (12) is disregarded, the enlargement magnification in the image center region is too small. Thus, to obtain the telephoto image in the image center region, it is necessary to perform electronic zooming by interpolation. This degrades image quality.

Preferably, the taking lens system SL fulfills conditions (2) to (4) below.

$$0.05 < |f/f_{asp}| < 1 \tag{2}$$

$$0.18 < f/TL < 2 \tag{3}$$

$$0.03 < T_{asp}/TL < 0.5 \tag{4}$$

where f represents the paraxial focal length of the entire system;

$f_{asp}$ represents the paraxial focal length of the lens element that has the aspherical surface;

TL represents the distance along the optical axis from the vertex of the most object-side surface of the taking lens system to the light-receiving surface of the image sensor; and $T_{asp}$ represents the thickness along the optical axis of the lens element that has the aspherical surface.

If the lower limit of condition (2) is disregarded, it is difficult to achieve compactness while maintaining satisfactory performance in both the wide-angle region and the image center region. If the upper limit of condition (2) is disregarded, the optical power of the aspherical lens element is so strong that it is difficult to correct the resulting large astigmatism and coma with other lens elements.

More preferably, condition (13) below is fulfilled.

$$0.07 < |f/f_{asp}| < 0.75 \tag{13}$$

If the lower limit of condition (13) is disregarded, among different factors, undercorrected astigmatism in particular degrades image surface quality and produces residual coma. If the upper limit of condition (13) is disregarded, astigmatism and coma are overcorrected. Under either condition, degraded performance results.

When condition (3) is fulfilled, it is possible to achieve compactness while achieving a wide angle of view and high definition in the telephoto image in the image center region simultaneously. If the lower limit of condition (3) is disregarded, the taking lens system is unduly large. This makes it difficult to differentiate it from a zoom optical system or a super-wide-angle lens having distortion corrected. If the upper limit of condition (3) is disregarded, it is difficult to correct various aberrations, and in addition the sensitivity to fabrication errors is unduly high. This makes the fabrication of the taking lens system extremely difficult in terms of, for example, the thicknesses of the individual lens elements at their center and edge.

More preferably, condition (14) below is fulfilled.

$$0.18 < f/TL < 0.8 \tag{14}$$

If the lower limit of condition (14) is disregarded, the taking lens system is unduly large. This makes it difficult to differentiate it from a zoom optical system or a super-wide-angle lens having distortion corrected. If the upper limit of condition (14) is disregarded, it is difficult to correct off-axial aberrations, and to meet the restrictions associated with limitations inevitable in the fabrication of the taking lens system in terms of, for example, the angles of incidence of the rays incident on the image sensor, the lens thicknesses of small-aperture lens elements at their center and edge.

If the lower limit of condition (4) is disregarded, the lens element that has the aspherical surface is too thin at its center. This makes the lens element difficult to fabricate. If the upper limit of condition (4) is disregarded, the lens element that has the aspherical surface is so thick at its center. This also makes the lens element difficult to fabricate.

More preferably, condition (15) below is fulfilled.

$$0.06 < T_{asp}/TL < 0.35 \tag{15}$$

If the lower limit of condition (15) is disregarded, the negative optical power of the lens element is too strong. This causes overcorrection of off-axial aberrations. If the upper limit of condition (15) is disregarded, the negative optical power of the lens element is too weak. This causes undercorrection of off-axial aberrations. Under either condition, degraded performance results. Moreover, in a case where the lens element having the aspherical surface is a plastic lens element, if the upper limit of condition (15) is disregarded, the large thickness of the lens element produces a widely varying temperature distribution inside it when it is molded. This makes it difficult to give the lens element a satisfactorily accurate shape.

Preferably, in the image center region, condition (16) below is fulfilled.

$$0 < Dc/Da < 0.5 \tag{16}$$

where

Dc represents the distortion (%) observed on the light-receiving surface of the image sensor at a position where the real image height is 0.5 La (in other words, at the maximum diagonal angle within the image center region).

If the lower limit of condition (16) is reached, it is difficult to correct aberrations while maintaining a compact construction. If the upper limit of condition (16) is disregarded, the image center region, where definition is high, is practically too narrow. Thus, to obtain a telephoto image, it is necessary to perform interpolation by electronic zooming. This degrades image quality.

More preferably, condition (17) below is fulfilled.

$$0.2 < Dc/Da < 0.4 \tag{17}$$

If the lower limit of condition (17) is disregarded, to correct distortion in the image center region, it is necessary to use an increased number of lens elements. If the upper limit of condition (17) is disregarded, the image center region, where definition is high, is too narrow. This lessens the characteristics of a fovea lens.

So long as an attempt is made to exploit the characteristics of the taking lens system described above so as to obtain a paraxial enlargement magnification comparable with that achieved at the telephoto end by the standard design adopting optical zooming, it is difficult to realize a super-wide total angle of view of about 180° as achieved by a conventional fish-eye lens. Accordingly, the maximum half view angle $\theta_{max}$ (in degrees) in the diagonal direction of the light-receiving surface of the image sensor fulfills, preferably, condition (18) below, and, more preferably, condition (19) below.

$$25° < \theta_{max} < 85° \quad (18)$$

$$30° < \theta_{max} < 60° \quad (19)$$

Likewise, the maximum half view angle $\theta v_{max}$ (in degrees) in the longer-side direction of the light-receiving surface of the image sensor fulfills, preferably, condition (20) below, and, more preferably, condition (21) below.

$$20° < \theta v_{max} < 80° \quad (20)$$

$$25° < \theta v_{max} < 50° \quad (21)$$

If the lower limit of condition (18) or (20) is disregarded, it is not possible to observe over a wide angle of view. If the upper limit of condition (18) or (20) is disregarded, it is difficult to correct, in particular, off-axial aberrations. To correct these aberrations, it is necessary either to narrow the image center region, where the enlargement magnification is high, or to reduce the enlargement magnification. This lessens the characteristics of the fovea-type design. On the other hand, if the lower limit of condition (19) or (21) is disregarded, the obtained angle of view is narrower than that of a common wide-angle lens. This lessens the advantage of the fovea-type design. If the upper limit of condition (19) or (21) is disregarded, large off-axial aberrations, in particular astigmatism, are produced, resulting in degraded performance.

Assuming that the shape of an aspherical surface is defined by formula (ASP) below using a local rectangular coordinate system (x, y, z) having its origin at the vertex of the surface, preferably, the aspherical surface mentioned above fulfills condition (5) below.

$$z = (c \cdot h^2)/[1 + \sqrt{1-(J+K) \cdot c^2 \cdot h^2}] + (A \cdot h^4 + B \cdot h^6 + C \cdot h^8 + D \cdot h^{10} + E \cdot h^{12} + F \cdot h^{14} + G \cdot h^{16} + H \cdot h^{18} + I \cdot h^{20}) \quad (ASP)$$

$$0.2 < |\Delta Zasp/\Delta Zsp| < 5 \quad (5)$$

where z represents the displacement (relative to the vertex) in the z-axis direction (along the optical axis) at the height h;

h represents the height ($h^2 = x^2 + y^2$) in a direction perpendicular to the z-axis;

c represents the curvature (=the reciprocal of the radius of curvature) at the vertex;

A, B, C, D, E, F, G, H, and I represents the aspherical coefficients of orders 4, 6, 8, 10, 12, 14, 16, 18, and 20, respectively;

K represents the conic coefficient;

$\Delta Zsp$ represents the amount of spherical sag at the maximum effective aperture; and $\Delta Zasp$ represents the amount of aspherical sag at the maximum effective aperture.

Figure 22:
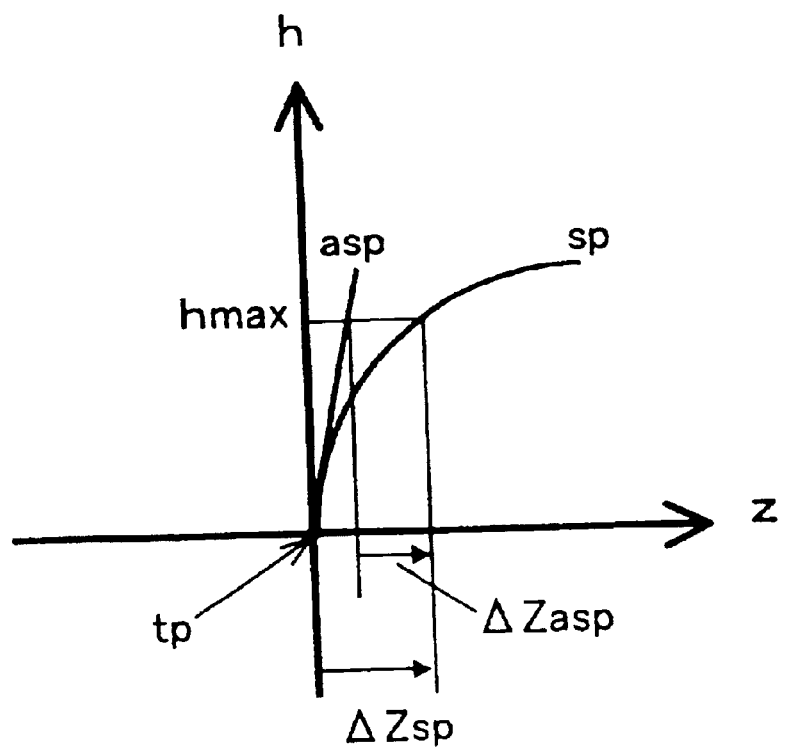
FIG. 22 is a diagram schematically showing the amount of sag with respect to an aspherical surface used in the taking lens system.

Here, the amount of spherical sag denotes the displacement along the optical axis from the vertex of the lens element to the point on the curve along the paraxial curvature which corresponds to the maximum effective aperture. On the other hand, the amount of aspherical sag denotes the difference, from the amount of spherical sag, of the distance along the optical axis from the vertex of the lens element to the point on the curve of the aspherical surface which corresponds to the maximum effective aperture. FIG. 22 shows the amounts of spherical and aspherical sag $\Delta Zsp$ and $\Delta Zasp$ observed in a spherical surface sp and an aspherical surface asp having identical paraxial curvatures. The amount of spherical sag $\Delta Zsp$ is the displacement along the optical axis (in the z-direction) from the vertex tp of the lens element to the point on the curve along the paraxial curvature which corresponds to the maximum effective aperture hmax (the height h is in the direction of the radius of the lens element). On the other hand, the amount of aspherical sag $\Delta Zasp$ is the difference, from the amount of spherical sag $\Delta Zsp$, of the distance along the optical axis (in the z-direction) from the vertex tp of the lens element to the point on the curve of the aspherical surface which corresponds to the maximum effective aperture hmax.

If the lower limit of condition (5) is disregarded, the amount of aspherical sag is too small. This makes it difficult to simultaneously obtain a wide angle of view and high definition in the telephoto image in the image center region. If the upper limit of condition (5) is disregarded, it is difficult to produce the metal mold for molding the aspherical surface.

More preferably, condition (22) below is fulfilled.

$$0.5 < |\Delta Zasp/\Delta Zsp| < 3 \quad (22)$$

If the lower limit of condition (22) is disregarded, the aspherical surface is ineffective in correcting astigmatism and coma, resulting in degraded performance. If the upper limit of condition (22) is disregarded, the angles of incidence of the rays incident on the aspherical surface are too large. Thus, the reflection by this surface produces ghosts, leading to degraded image quality. Moreover, the aspherical surface has unduly large undulations. This makes it difficult to coat it with an anti-reflection film of uniform thickness.

In all the embodiments, the image input optical system OP is composed solely of refractive lens elements, which deflect incident light by refraction (i.e. lens elements of the type that deflects light at the interface between two media having different refractive indices). It is possible, however, to replace any of these lens elements with a lens element of any other type, for example, a diffractive lens element, which deflects incident light by diffraction, or a refractive/diffractive hybrid lens element, which deflects incident light by diffraction and refraction combined together, or a gradient index lens element, which deflects incident light with varying refractive indices distributed within a medium. Among these types, gradient index lens elements, which have varying refractive indices distributed within a medium, are expensive because of the complicated fabrication process they require. Therefore, it is preferable to use lens elements formed out of a uniform material.

In the taking lens system SL, in addition to the aperture stop ST, a beam restricting plate or the like for cutting unnecessary light may be arranged as necessary. In all the embodiments, the image input optical system OP adopts a so-called centered optical construction, where lens elements and other components are arranged on a single straight-line optical axis AX. It is also possible, however, to arrange an optical member such as a kind of prism (for example, a rectangular prism) or a kind of mirror (for example, a flat mirror) in the optical path so as to bend, with a surface thereof having no optical power (for example, a reflective, refractive, or diffractive surface) the optical path in front of, behind, or in the middle of the taking lens system SL and thereby form a bending optical system (for example, an optical system that reflects a light beam so as to bend the optical axis AX at approximately 90° (i.e., at precisely or substantially 90°)). Where to bend the optical path may be determined to suit particular needs. By bending the optical path appropriately, it is possible to make apparently slim and compact the appliance (such as a digital camera or surveillance camera) in which the taking lens system SL is incorporated.

EXAMPLES

Hereinafter, practical examples of the optical construction and other features of image-taking apparatuses embodying the present invention will be presented with reference to their construction data and other data. Examples 1 to 7 presented below are numerical examples corresponding to the first to seventh embodiments, respectively, described hereinbefore, and therefore the optical construction diagrams (FIGS. 1 to 7) of the first to seventh embodiments also show the lens construction, optical path, and other features of Examples 1 to 7, respectively.

Tables 1 to 7 show the construction data of Examples 1 to 7, respectively. In the construction data of each example, si (i=1, 2, 3, . . . ) represents the i-th surface as counted from the object side (the last surface is the image surface IM), ri (i=1, 2, 3, . . . ) represents the radius of curvature (mm) of the surface si, di (i=1, 2, 3, . . . ) represents the axial distance (mm) between the i-th surface si and the (i+1)th surface si+1 as counted from the object side, and Ni (i=1, 2, 3, . . . ) and vi (i=1, 2, 3, . . . ) respectively represent the refractive index (Nd) for the d-line and the Abbe number (vd) of the optical material filling the axial distance di. Shown together with these data are the focal length (f, in mm), f-number (Fno), and maximum angle of view ($2\theta_{max}$ in °) of the entire system.

A surface si marked with an asterisk (*) is an aspherical surface (a refractive optical surface having an aspherical shape, a surface that exerts a refractive effect equivalent to that of an aspherical surface, or the like). The surface shape of such an aspherical surface is defined by formula (ASP) noted earlier. The aspherical surface data of the aspherical surfaces used in each example are also shown together with the other data mentioned above. In the aspherical surface data, E-n represents $\times 10^{-n}$, and any coefficient that is not shown there equals 0. Table 8 shows the values of the parameters defined by the conditional formulae as actually observed in each example.

FIGS. 8A to 8C, 9A to 9C, 10A to 10C, 11A to 11C, 12A to 12C, 13A to 13C, and 14A to 14C are aberration diagrams of Examples 1 to 7. Of these aberration diagrams, those of which the number is suffixed with "A" are diagrams that show spherical aberration (longitudinal spherical aberration), those of which the number is suffixed with "B" are diagrams that show astigmatism (astigmatic field curves), and those of which the number is suffixed with "C" are diagrams that show distortion. In the spherical aberration diagrams, the solid line, broken line, and dash-dot-dot line represent the spherical aberration observed with the d-line (having a wavelength of 587.56 nm), C-line (having a wavelength of 656.28 nm), and g-line (having a wavelength of 435.84 nm), respectively, given as deviations (taken along the horizontal axis, in mm) from the paraxial image surface along the optical axis AX, with the vertical axis representing the height of incidence on the pupil as normalized with respect to the maximum height (i.e., the relative pupil height). In the astigmatism diagrams, the broken line and sold line represent the tangential and sagittal image surfaces, respectively, observed with the d-line, given as deviations (taken along the horizontal axis, in mm) from the paraxial image surface along the optical axis AX, with the vertical axis representing the half view angle (ANGLE, in degrees). In the distortion diagrams, the horizontal axis represents the distortion (%) observed with the d-line, with the vertical axis representing the half view angle (ANGLE, in degrees).

It should be understood that the embodiments and examples described hereinbefore include the constructions (L1) to (L10), (U1) to (U3), (C1) to (C4), and (D1) and (D2) noted below, and, with those constructions, it is possible to realize taking lens systems and the like that, despite having a large aperture, is compact and offers high performance while exploiting the advantages of a fovea lens. Moreover, with their respective features, it is possible to achieve the advantages described earlier.

(L1) A taking lens system for forming an optical image on the light-receiving surface of an image sensor, wherein the most object-side lens surface is an aspherical surface that is so shaped as to have a positive optical power in a central portion thereof and a negative optical power in a peripheral portion thereof, and condition (1) or (6) noted earlier is fulfilled.

(L2) A taking lens system for forming an optical image on the light-receiving surface of an image sensor, wherein the taking lens system comprises a front lens unit and a rear lens unit arranged with an aperture stop disposed in between, the front and rear lens units each have a positive optical power as a whole, at least one lens surface in the front lens unit is an aspherical surface that is so shaped as to have a positive optical power in a central portion thereof and a negative optical power in a peripheral portion thereof, and condition (1) or (6) noted earlier is fulfilled.

(L3) A taking lens system as described in (L1) or (L2) above, wherein conditions (2) to (4) are fulfilled.

(L4) A taking lens system as described in one of (L1) to (L3) above, wherein, assuming that an aspherical surface is defined by formula (ASP) noted earlier that uses a local rectangular coordinate system (x, y, z) having its origin at the vertex of the surface, the aforementioned aspherical surface is so shaped as to fulfill condition (5) or (22) noted earlier.

(L5) A taking lens system as described in one of (L2) to (L4) above, wherein condition (7) or (8) is fulfilled.

(L6) A taking lens system as described in one of (L1) to (L5) above, wherein condition (9) or (10) is fulfilled.

(L7) A taking lens system as described in one of (L1) to (L6) above, wherein condition (11) or (12) is fulfilled.

(L8) A taking lens system as described in one of (L3) to (L7) above, wherein condition (13), (14), or (15) is fulfilled.

(L9) A taking lens system as described in one of (L1) to (L8) above, wherein condition (16) or (17) is fulfilled.

(L10) A taking lens system as described in one of (L1) to (L9) above, wherein condition (18), (19), (20), or (21) is fulfilled.

(U1) An image-taking apparatus comprising a taking lens system as described in one of (L1) to (L10) above and an image sensor that converts the optical image formed by the taking lens system into an electrical signal.

(U2) An image-taking apparatus as described in (U1) above, further comprising a panning/tilting mechanism.

(U3) An image-taking apparatus as described in (U1) or (U2) above, further comprising an image processing circuit for correcting distortion of the image formed on the light-receiving surface of the image sensor.

(C1) A camera comprising an image-taking apparatus as described in (U1) above and a mechanism that permits the image-taking apparatus to pan and tilt.

(C2) A camera comprising an image-taking apparatus as described in (U1) above and an image processing circuit for correcting distortion of the image formed on the light-receiving surface of the image sensor.

(C3) A camera comprising an image-taking apparatus as described in one of (U1) to (U3) above, wherein the camera is used to shoot at least a still picture or a moving picture of a subject.

(C4) A camera as described in (C3) above, wherein the camera is a digital camera, video camera, surveillance camera, car-mounted camera, camera for a videophone, camera for an intercom, or a camera incorporated in or externally fitted to a personal computer, mobile computer, cellular phone, personal digital assistant, or peripheral device therefor.

(D1) A digital appliance comprising an image-taking apparatus as described in one of (U1) to (U3) above so as to have at least one of a capability of shooting a still picture of a subject and a capability of shooting a moving picture of a subject.

(D2) A digital appliance as described in (D1) above, wherein the digital appliance is a personal computer, mobile computer, cellular phone, personal digital assistant, or peripheral device therefor.

As described above, according to the above embodiments and examples, a taking lens system has a peculiar aspherical surface, and has distortion characteristics that fulfill condition (1). This makes it possible to simultaneously achieve a wide angle of view and a long focal length, which have conventionally been difficult to achieve simultaneously. Moreover, it is possible to obtain, in a image center region, an image enlarged at an enlargement magnification comparable with that achieved at the telephoto end with the standard design adopting optical zooming, and in addition without degrading image quality. In this way, it is possible to realize an image-taking apparatus provided with a taking lens system that, despite having a large aperture, is compact and offers high performance while exploiting the advantages of a fovea lens. Moreover, by providing the image-taking apparatus additionally with a rotation mechanism that permits it to rotate at least in one direction to change the shooting direction, it is possible to sense the region of interest always with the image center region, where resolution is high.

TABLE 1

Example 1
f = 4.72 mm   Fno = 2.8   2 θ max = 110°

| si | ri(mm) | di(mm) | Ni | υi | Power etc. |
|---|---|---|---|---|---|
| s1* | 3.790 | 2.011 | 1.49300 | 58.34 | (−) |
| s2* | 1.968 | 0.729 | | | |
| s3 | −56.369 | 1.226 | 1.62406 | 41.78 | (+) |
| s4 | −4.224 | 0.701 | | | |
| s5 | ∞ | 0.100 | | | ST |

TABLE 1-continued

| s6 | 4.523 | 1.885 | 1.69829 | 53.68 | (+) |
|---|---|---|---|---|---|
| s7 | −3.000 | 1.000 | 1.79850 | 22.60 | |
| s8 | 92.203 | 0.229 | | | |
| s9* | 4.149 | 1.519 | 1.49300 | 58.34 | (+) |
| s10* | 8.413 | 0.800 | | | |
| s11 | ∞ | 0.300 | 1.51680 | 64.20 | PL |
| s12 | ∞ | 0.500 | | | |
| s13 | ∞ | | | | IM |

Aspherical Surface Data of the i-th Surface (si*)

| si | K | A | B | C | D |
|---|---|---|---|---|---|
| s1 | 0 | −1.27873E−02 | −3.84221E−03 | 6.08760E−04 | −2.84514E−05 |
| s2 | 0 | −4.30295E−02 | −1.15384E−02 | 6.59233E−03 | −1.27669E−03 |
| s9 | 0 | −2.70423E−02 | 7.87697E−03 | −1.65341E−03 | 1.37393E−04 |
| s10 | 0 | −9.26774E−02 | 1.96628E−02 | −2.47074E−03 | 1.45771E−04 |

TABLE 2

Example 2
f = 6.20 mm   Fno = 2.8   2 θ max = 66°

| si | ri(mm) | di(mm) | Ni | υi | Power etc. |
|---|---|---|---|---|---|
| s1* | 5.319 | 2.014 | 1.49300 | 58.34 | (−) |
| s2* | 1.923 | 0.641 | | | |
| s3* | 1.642 | 1.000 | 1.49300 | 58.34 | (+) |
| s4* | 9.080 | 0.518 | | | |
| s5 | ∞ | 0.469 | | | ST |
| s6 | 19.707 | 0.773 | 1.79850 | 22.60 | (+) |
| s7 | 3.347 | 1.658 | 1.67249 | 50.95 | |
| s8 | −5.187 | 0.729 | | | |
| s9* | −25.519 | 1.598 | 1.49300 | 58.34 | (−) |
| s10* | 6.344 | 0.800 | | | |
| s11 | ∞ | 0.300 | 1.51680 | 64.20 | PL |
| s12 | ∞ | 0.502 | | | |
| s13 | ∞ | | | | IM |

Aspherical Surface Data of the i-th Surface (si*)

| si | K | A | B | C | D |
|---|---|---|---|---|---|
| s1 | 0 | −2.07349E−02 | −3.11203E−03 | 6.45668E−04 | −2.93473E−05 |
| s2 | 0 | −9.04865E−02 | −1.99061E−02 | 1.15520E−02 | −2.00661E−03 |
| s3 | 0 | −4.30515E−03 | −6.46436E−03 | −4.08943E−03 | 3.01034E−03 |
| s4 | 0 | 8.02177E−02 | 2.17150E−02 | −2.39666E−02 | 2.08080E−02 |
| s9 | 0 | −5.16148E−03 | 6.29471E−03 | −1.31571E−03 | 1.44411E−04 |
| s10 | 0 | −5.82037E−02 | 9.88067E−03 | −1.14654E−03 | 9.81833E−05 |

TABLE 3

Example 3
f = 6.20 mm   Fno = 2.0   2 θ max = 84°

| si | ri(mm) | di(mm) | Ni | υi | Power etc. |
|---|---|---|---|---|---|
| s1* | 24.489 | 5.000 | 1.49300 | 58.34 | (−) |
| s2* | 3.369 | 2.090 | | | |
| s3* | 6.139 | 1.259 | 1.53048 | 55.72 | (+) |
| s4* | −9.886 | 2.121 | | | |
| s5 | ∞ | 1.533 | | | ST |
| s6 | 5.529 | 1.398 | 1.75450 | 51.57 | (+) |
| s7 | −8.944 | 1.000 | 1.79850 | 22.60 | |

TABLE 3-continued

| si | ri | di | Ni | νi | Power etc. |
|---|---|---|---|---|---|
| s8 | 12.530 | 2.032 | | | |
| s9* | 4.794 | 1.966 | 1.49300 | 58.34 | (+) |
| s10* | 5.264 | 0.800 | | | |
| s11 | ∞ | 0.300 | 1.51680 | 64.20 | PL |
| s12 | ∞ | 0.500 | | | |
| s13 | ∞ | | | | IM |

Aspherical Surface Data of the i-th Surface (si*)

| si | K | A | B | C | D |
|---|---|---|---|---|---|
| s1 | 0 | −3.55841E−03 | −8.15535E−05 | 9.58815E−06 | −1.80551E−07 |
| s2 | 0 | −1.57568E−02 | 2.38799E−04 | 2.99959E−05 | −3.11617E−06 |
| s3 | 0 | −4.09647E−03 | −5.69021E−04 | 3.14238E−05 | 1.53696E−07 |
| s4 | 0 | −5.90371E−04 | −5.13317E−04 | 3.31641E−05 | −1.11499E−06 |
| s9 | 0 | −3.56593E−03 | 4.22577E−04 | −6.52306E−05 | −1.20078E−06 |
| s10 | 0 | −2.48066E−02 | 2.54331E−03 | −2.45458E−04 | 9.39490E−06 |

TABLE 4

Example 4
f = 5.31 mm   Fno = 1.8   2 θ max = 100°

| si | ri(mm) | di(mm) | Ni | νi | Power etc. |
|---|---|---|---|---|---|
| s1* | 17.670 | 5.811 | 1.49300 | 58.34 | (−) |
| s2* | 4.378 | 6.583 | | | |
| s3 | 17.799 | 3.259 | 1.81774 | 43.04 | (+) |
| s4 | −11.576 | 0.305 | | | |
| s5 | ∞ | 0.100 | | | ST |
| s6 | 5.339 | 2.627 | 1.66132 | 55.39 | (+) |
| s7 | −6.489 | 1.000 | 1.81004 | 22.89 | |
| s8 | 7.866 | 2.194 | | | |
| s9 | 4.092 | 1.680 | 1.49300 | 58.34 | (+) |
| s10* | 6.140 | 0.640 | | | |
| s11 | ∞ | 0.300 | 1.51680 | 64.20 | PL |
| s12 | ∞ | 0.500 | | | |
| s13 | ∞ | | | | IM |

Aspherical Surface Data of the i-th Surface (si*)

| si | K | A | B | C | D |
|---|---|---|---|---|---|
| s1 | 0 | −1.07155E−03 | −1.34506E−05 | 6.30511E−07 | −5.27525E−09 |
| s2 | 0 | −2.76477E−03 | −8.58620E−05 | 1.06786E−05 | −4.49560E−07 |
| s10 | 0 | −1.56071E−02 | 2.32751E−03 | −2.51642E−04 | 1.34181E−05 |

TABLE 5

Example 5
f = 5.31 mm   Fno = 2.0   2 θ max = 100°

| si | ri(mm) | di(mm) | Ni | νi | Power etc. |
|---|---|---|---|---|---|
| s1* | 18.795 | 7.891 | 1.49300 | 58.34 | (−) |
| s2* | 4.243 | 5.201 | | | |
| s3* | 16.330 | 1.228 | 1.84666 | 23.82 | (+) |
| s4 | 556.791 | 3.692 | | | |
| s5 | ∞ | 0.100 | | | ST |
| s6 | 6.101 | 1.645 | 1.75450 | 51.57 | (+) |
| s7 | −4.464 | 1.000 | 1.79850 | 22.60 | |
| s8 | −73.509 | 1.155 | | | |
| s9* | −7.367 | 1.458 | 1.49300 | 58.34 | (+) |
| s10* | −4.051 | 3.000 | | | |
| s11 | ∞ | 0.530 | 1.51680 | 64.20 | PL |

TABLE 5-continued

| si | ri | di | Ni | νi | Power etc. |
|---|---|---|---|---|---|
| s12 | ∞ | 0.300 | | | |
| s13 | ∞ | 0.300 | 1.51680 | 64.20 | |
| s14 | ∞ | 0.500 | | | |
| s15 | ∞ | | | | IM |

Aspherical Surface Data of the i-th Surface (si*)

| si | K | A | B | C | D |
|---|---|---|---|---|---|
| s1 | 0 | −1.03238E−03 | −2.30098E−06 | 2.74998E−07 | −2.21371E−09 |
| s2 | 0 | −5.00170E−03 | 1.71286E−04 | −6.47913E−06 | 1.47945E−07 |
| s3 | 0 | 2.15515E−05 | 4.95686E−05 | −1.33385E−06 | 2.68003E−08 |
| s9 | 0 | −1.39980E−02 | −5.43951E−04 | −8.19861E−05 | 7.05390E−07 |
| s10 | 0 | −9.99308E−03 | 2.97384E−04 | −4.42063E−05 | 7.60229E−10 |

TABLE 6

Example 6
f = 4.72 mm   Fno = 2.8   2 θ max = 110°

| si | ri(mm) | di(mm) | Ni | νi | Power etc. |
|---|---|---|---|---|---|
| s1 | 14.185 | 1.000 | 1.81083 | 22.91 | (−) |
| s2 | 6.801 | 0.500 | | | |
| s3* | 3.166 | 2.442 | 1.85000 | 40.04 | |
| s4* | 1.782 | 0.431 | | | |
| s5 | 31.300 | 1.236 | 1.68044 | 31.12 | (+) |
| s6 | −3.947 | 0.533 | | | |
| s7 | ∞ | 0.100 | | | ST |
| s8 | 4.602 | 1.869 | 1.75450 | 51.57 | (+) |
| s9 | −3.000 | 1.000 | 1.79850 | 22.60 | |
| s10 | 16.816 | 0.069 | | | |
| s11* | 3.391 | 1.720 | 1.49300 | 58.34 | (+) |
| s12* | 44.496 | 0.800 | | | |
| s13 | ∞ | 0.300 | 1.51680 | 64.20 | PL |
| s14 | ∞ | 0.500 | | | |
| s15 | ∞ | | | | IM |

Aspherical Surface Data of the i-th Surface (si*)

| si | K | A | B | C | D |
|---|---|---|---|---|---|
| s3 | 0 | −8.29738E−03 | −1.36484E−03 | −2.28964E−04 | 2.72290E−05 |
| s4 | 0 | −4.04258E−02 | −2.11476E−02 | 9.57667E−03 | −2.17707E−03 |
| s11 | 0 | −1.82450E−02 | 4.28736E−03 | −7.39027E−04 | 6.11585E−05 |
| s12 | 0 | −7.19439E−02 | 1.55023E−02 | −1.80339E−03 | 1.21327E−04 |

TABLE 7

Example 7
f = 4.62 mm   Fno = 2.0   2 θ max = 110°

| si | ri(mm) | di(mm) | Ni | νi | Power etc. |
|---|---|---|---|---|---|
| s1* | 5.392 | 1.836 | 1.49300 | 58.34 | (−) |
| s2* | 3.994 | 1.805 | | | |
| s3 | −12.901 | 2.412 | 1.74102 | 39.89 | |
| s4 | 4.563 | 1.126 | | | |
| s5 | 6.512 | 3.000 | 1.84966 | 37.47 | (+) |
| s6 | −10.038 | 1.580 | | | |
| s7 | ∞ | 0.100 | | | ST |
| s8 | 5.320 | 1.715 | 1.71126 | 53.15 | (+) |
| s9 | −3.606 | 1.000 | 1.84671 | 23.96 | |
| s10 | 157.235 | 2.145 | | | |
| s11* | 4.262 | 1.682 | 1.49300 | 58.34 | (+) |

TABLE 7-continued

| s12* | 4.913 | 0.800 | | | |
|---|---|---|---|---|---|
| s13 | ∞ | 0.300 | 1.51680 | 64.20 | PL |
| s14 | ∞ | 0.500 | | | |
| s15 | ∞ | | | | IM |

Aspherical Surface Data of the i-th Surface (si*)

| si | K | A | B | C | D |
|---|---|---|---|---|---|
| s1 | 0 | −3.26213E−03 | −2.00416E−04 | 1.22278E−05 | −2.41038E−07 |
| s2 | 0 | −6.34284E−03 | −3.23844E−04 | 4.44018E−05 | −2.06700E−06 |
| s11 | 0 | −6.99119E−03 | 7.32953E−04 | −1.49840E−04 | 1.28862E−06 |
| s12 | 0 | −2.11291E−02 | 2.98869E−03 | −4.77587E−04 | 2.47983E−05 |

TABLE 8

Values of Conditional Formulae

| | | Example | | | | | | |
|---|---|---|---|---|---|---|---|---|
| Conditional Formula | | 1 | 2 | 3 | 4 | 5 | 6 | 7 |
| (1),(6) | Da | −68.2 | −43.4 | −54.3 | −59.7 | −59.7 | −68.1 | −59.5 |
| (2),(13) | $\|f/f_{asp}\|$ | 0.36 | 0.82 | 0.72 | 0.39 | 0.39 | 0.19 | 0.08 |
| (3),(14) | f/TL | 0.43 | 0.56 | 0.31 | 0.21 | 0.19 | 0.38 | 0.23 |
| (4),(15) | $T_{asp}/TL$ | 0.18 | 0.18 | 0.25 | 0.23 | 0.28 | 0.20 | 0.09 |
| (5),(22) | $\|\Delta Zasp/\Delta Zsp\|$ | 0.88 | 1.07 | 2.59 | 1.30 | 1.34 | 0.54 | 0.78 |
| (7),(8) | $f_f/f_r$ | 3.30 | 0.49 | 2.13 | 0.75 | — | 6.89 | 2.53 |
| (9),(10) | $\|\alpha\|$ | 12.3 | 14.5 | 2.4 | 4.0 | 13.9 | 12.1 | 9.6 |
| (11),(12) | $f_{135}/f_{wide}$ | 5.01 | 3.00 | 3.00 | 3.12 | 3.17 | 5.01 | 4.91 |
| (16),(17) | Dc/Da | 0.37 | 0.32 | 0.26 | 0.25 | 0.28 | 0.37 | 0.23 |
| (18),(19) | $\theta_{max}$ | 55.0 | 33.0 | 42.0 | 50.0 | 50.0 | 55.0 | 55.0 |
| (20),(21) | $\theta v_{max}$ | 48.4 | 27.2 | 27.2 | 32.0 | 32.3 | 48.4 | 48.4 |

What is claimed is:

1. An image-taking apparatus comprising:

an image sensor for converting an optical image into an electrical signal; and a taking lens system for forming the optical image on a light-receiving surface of the image sensor;

wherein a most object-side surface of the taking lens system is an aspherical surface that has a positive optical power in a central portion thereof and a negative optical power in a peripheral portion thereof, and wherein the following condition is fulfilled:

$$-90 < Da < -20$$

where

Da represents distortion (%) observed at a maximum half view angle in a diagonal direction of the image sensor.

2. An image-taking apparatus as claimed in claim 1, wherein the following conditions are fulfilled:

$$0.05 < |f/f_{asp}| < 1$$

$$0.18 < f/TL < 2$$

$$0.03 < T_{asp}/TL < 0.5$$

where $f_{asp}$ represents a paraxial focal length of a lens element included in the taking lens system which has the aspherical surface;

f represents a paraxial focal length of the taking lens system as a whole;

TL represents a distance along an optical axis from a vertex of the most object-side surface of the taking lens system to the light-receiving surface of the image sensor; and $T_{asp}$ represents a thickness along the optical axis of the lens element that has the aspherical surface.

3. An image-taking apparatus as claimed in claim 1, wherein the following condition is fulfilled:

$$0.2 < |\Delta Zasp/\Delta Zsp| < 5$$

where

ΔZsp represents amount of spherical sag at a maximum effective aperture; and

ΔZasp represents amount of aspherical sag at the maximum effective aperture.

4. An image-taking apparatus as claimed in claim 1, wherein a most image-side lens element of the taking lens system has a positive optical power.

5. An image-taking apparatus as claimed in claim 1, wherein the taking lens system comprises, from an object side to an image side thereof, a first lens unit having a negative optical power;
a second lens unit having a positive optical power;
an aperture stop;
a third lens unit having a positive optical power; and
a fourth lens unit.

6. An image-taking apparatus as claimed in claim 5, wherein the lens units are each composed of, at most, two lens elements or one pair of lens elements cemented together.

7. An image-taking apparatus as claimed in claim 1, wherein a most image-side lens element and a most object-side lens element of the taking lens system are each a plastic lens element having an aspherical surface, and wherein the most object-side lens element of the taking lens system has a negative optical power and the most image-side lens element of the taking lens system has a positive optical power.

8. An image-taking apparatus as claimed in claim 1, wherein the following condition is fulfilled:

$$2 < [21.63 \times f/(0.5 \times La)]/[18/\tan\theta v_{max}] < 10$$

where

La represents a distance from a center to a diagonal corner of the image sensor;

f represents a paraxial focal length of the taking lens system as a whole; and $\theta v_{max}$ represents a maximum half view angle in a direction along longer sides of the image sensor.

9. An image-taking apparatus as claimed in claim 1, wherein the following condition is fulfilled:

$0<Dc/Da<0.5$ where

Dc represents distortion (%) observed on the image sensor at a maximum diagonal angle within a central region of the image.

10. An image-taking apparatus comprising:

an image sensor for converting an optical image into an electrical signal; and a taking lens system for forming the optical image on a light-receiving surface of the image sensor, the taking lens system comprising, from an object side to an image side thereof:
  a front lens unit having a positive optical power as a whole;
  an aperture stop; and
  a rear lens unit having a positive optical power as a whole, wherein at least one surface included in the front lens unit is an aspherical surface that has a positive optical power in a central portion thereof and a negative optical power in a peripheral portion thereof, and wherein the following condition is fulfilled:

$-90<Da<-20$ where where

Da represents distortion (%) observed at a maximum half view angle in a diagonal direction of the image sensor.

11. An image-taking apparatus as claimed in claim 10, wherein the following conditions are fulfilled:

$0.05<|f/f_{asp}|<1$ $0.18<f/TL<2$ $0.03<T_{asp}/TL<0.5$ where $f_{asp}$ represents a paraxial focal length of a lens element included in the taking lens system which has the aspherical surface;

f represents a paraxial focal length of the taking lens system as a whole;

TL represents a distance along an optical axis from a vertex of the most object-side surface of the taking lens system to the light-receiving surface of the image sensor; and $T_{asp}$ represents a thickness along the optical axis of the lens element that has the aspherical surface.

12. An image-taking apparatus as claimed in claim 10, wherein the following condition is fulfilled:

$0.2<|\Delta Zasp/\Delta Zsp|<5$ where $\Delta Zsp$ represents amount of spherical sag at a maximum effective aperture; and $\Delta Zasp$ represents amount of aspherical sag at the maximum effective aperture.

13. An image-taking apparatus as claimed in claim 10, wherein the following condition is fulfilled:

$0<f_f/f_r<10$ where $f_f$ represents a focal length of the front lens unit as a whole, and $f_r$ represents a focal length of the rear lens unit as a whole.

14. An image-taking apparatus as claimed in claim 10, wherein a most image-side lens element of the taking lens system has a positive optical power.

15. An image-taking apparatus as claimed in claim 10, wherein the front lens unit comprises, from an object side to an image side thereof,
  a first lens unit having a negative optical power; and
  a second lens unit having a positive optical power, and
wherein the rear lens unit comprises, from an object side to an image side thereof,
  a third lens unit having a positive optical power; and
  a fourth lens unit.

16. An image-taking apparatus as claimed in claim 15, wherein the lens units are each composed of, at most, two lens elements or one pair of lens elements cemented together.

17. An image-taking apparatus as claimed in claim 10, wherein a most image-side lens element and a most object-side lens element of the taking lens system are each a plastic lens element having an aspherical surface, and wherein the most object-side lens element of the taking lens system has a negative optical power and the most image-side lens element of the taking lens system has a positive optical power.

18. An image-taking apparatus as claimed in claim 10, wherein the following condition is fulfilled:

$2<[21.63\times f/(0.5\times La)]/[18/\tan \theta v_{max}]<10$ where

La represents a distance from a center to a diagonal corner of the image sensor;

f represents a paraxial focal length of the taking lens system as a whole; and $\theta v_{max}$ represents a maximum half view angle in a direction along longer sides of the image sensor.

19. An image-taking apparatus as claimed in claim 10, wherein the following condition is fulfilled:

$0<Dc/Da<0.5$ where

Dc represents distortion (%) observed on the image sensor at a maximum diagonal angle within a central region of the image.

20. A camera comprising an image-taking apparatus as claimed in claim 1 or 10, wherein the camera has at least one of a capability of shooting a still picture and a capability of shooting a moving picture.

21. A camera as claimed in claim 20, further comprising:
a rotating mechanism for rotating the image-taking apparatus at least in one direction to change a shooting direction of the image-taking apparatus.

22. A camera system comprising:
an image-taking apparatus as claimed in claim 1 or 10, and
an image processor for correcting distortion,
wherein the image processor converts the electrical signal representing the optical image into image data of an image that is roughly similar to a scene perceived by a human eye and that is substantially distortionless.

* * * * *